(12) United States Patent
Groft

(10) Patent No.: US 7,768,426 B2
(45) Date of Patent: Aug. 3, 2010

(54) PARKING SYSTEM EMPLOYING REM TECHNIQUES

(75) Inventor: Eric Groft, South Boston, MA (US)

(73) Assignee: Innovapark, LLC, New York, NY (US)

( * ) Notice: Subject to any disclaimer, the term of this patent is extended or adjusted under 35 U.S.C. 154(b) by 413 days.

(21) Appl. No.: 11/802,244

(22) Filed: May 21, 2007

(65) Prior Publication Data

US 2008/0291054 A1 Nov. 27, 2008

(51) Int. Cl.
*B60Q 1/48* (2006.01)
(52) U.S. Cl. .......... 340/932.2; 340/933; 340/539.1; 705/13; 705/418
(58) Field of Classification Search .......... 340/932.2, 340/933, 937, 938, 904, 942, 905, 955, 539.1, 340/539.13, 539.11, 928; 701/1, 36; 235/381, 235/385, 384, 378; 705/13, 418
See application file for complete search history.

(56) References Cited

U.S. PATENT DOCUMENTS

| | | | |
|---|---|---|---|
| 6,885,311 B2 | 4/2005 | Howard et al. | |
| 6,885,936 B2 | 4/2005 | Yashio | |
| 6,946,974 B1 | 9/2005 | Racunas | |
| 7,091,882 B2 | 8/2006 | Doyle | |
| 7,123,166 B1 | 10/2006 | Haynes et al. | |
| 7,135,991 B2 | 11/2006 | Slemmer et al. | |
| 7,146,270 B2 | 12/2006 | Nozaki et al. | |
| 7,188,070 B2 | 3/2007 | Dar et al. | |
| 7,230,545 B2 * | 6/2007 | Nath et al. | 340/932.2 |
| 7,382,277 B2 * | 6/2008 | Ioli Trust | 340/932.2 |
| 7,393,134 B2 * | 7/2008 | Mitschele | 368/90 |

\* cited by examiner

*Primary Examiner*—Anh V La
(74) *Attorney, Agent, or Firm*—R. J. Lasker, Esq.

(57) ABSTRACT

The system described is an integrated parking management system which makes use of patented vehicle detectors to collect and transmit data, essentially in near real time, as to all events happening as to single or multiple parking spaces (e.g. current and historic use, length of time of occupancy of current occupant) to a central clearing device for which patent application has been made which serves as a logic core and repository, making use of proprietary software, analyzing, displaying and distributing the data so developed as to a parking plant and all of its components to allow all parties (including prospective users) who are concerned with the various aspects of a parking plant and its components (e.g. determination as to availability of spaces, maintenance and repair of meters, collection of revenues and enforcement of parking regulations) not only to access and make passive use of the information developed, in near real time, to permit them to identify what's happening to the plant and its components as to their own particular interest in such plant and so maximize the efficient use both of the resources of the plant and their own resources directed to the particular aspect of their interface with the plant and its components but also to access and make active use of such information for whatever purpose and in whatever fashion using whatever means of access they may wish. While others have made claim to certain of the individual functions described, e.g. vehicle detection, nobody has identified or patented.

7 Claims, 13 Drawing Sheets

PARKING SYSTEM EMPLOYING REM TECHNIQUES

BACKGROUND OF THE INVENTION

1. Field of the Invention

This invention relates to the management of vehicle parking systems and in particular to such systems using remote management techniques for enhancing management efficiency and to provide solutions to the parking system that could not otherwise be managed by (1) sensing, collecting, recording and displaying data regarding all aspects of the environment pertaining to the parking system, (2) analyzing the data collected to create actionable outputs responsive to the needs of the public and the management of the parking system; (3) communicating with the various parking system components; and (4) receiving feedback to perform requested operations for the parking system.

2. Related Art

Parking Systems

Although many of the components their respective functions, such as electronic parking meters, collector nodes, nodes, gateways cellular modems, web portals, the internet, wireless communication, computer processing unit (CPU) associated with vehicle parking systems are known, there does not exist interactive system which, in near real time, monitors existing parking meters as to all facets of their existence and operation (including maintenance and length of stay) and transmits, analyzes, displays and makes available for all users the information so obtained and produced.

Parking Management

The management of an entity's available parking is a challenge to those tasked with administration of that entity. Parking is a resource that has both a diverse user group and a high level of economic and environmental impact. The available supply of parking is often much smaller than the demand for it, but is also continually changing. This results in shortages that need to be fairly distributed. Price fluctuations to meet changes in demand are also impossible to institute because of lack of timely knowledge as to the changes.

Price is not the only means by which people have tried to manage parking. They have also sought to ration parking through the use of time limits for use of the parking spaces. However, the dispersed nature of parking spaces makes monitoring of the spaces by traditional methods ineffective.

Tools exist currently to aide in the management of parking resources. The deployment of parking meters greatly enhances the ability to collect monies and monitor the use of parking spaces. However, these meters also create a further management issue as these pieces of equipment require regular preventative maintenance as well as occasional repair. Such actions must be performed by skilled personnel. This places an additional burden on the administrative body to monitor not only the spaces, but the dispersed equipment, parts and personnel and to determine when a particular meter is out of order.

All of this monitoring and management is the challenge of parking administrators. It generally requires all or almost all of the manager's time simply to keep the operation running leaving little time to devote to actual balancing of use and availability of parking spaces to the general public. In this regard, the current approaches to parking management fail to perform the function they were designed to achieve.

Parking Space as an Asset

Due to a limited supply of space and a high degree of demand for parking, parking spaces have been delineated for the purpose of distributing the asset fairly. In addition to partition of the assets, time-sharing or rationing occurs in towns where time limits are imposed for the use of the asset. This meant the need to establish and enforce the rules and the commitment of human resources to the management of the asset and its use. This represented a new asset of the community.

The introduction of the parking meter allowed for time-sharing of parking spaces to be timed automatically and increased the efficiency of the human resources committed to parking management. It also allowed for the collection of parking fees without requiring the continuous presence of a fee collector. While this new asset improved efficiency in the management of a limited resource, it has significant collateral requirements and effects. These include the need to repair meters, to enforce parking regulations and to collect revenues. To maximize the efficiency of the parking plant from all points of view, one must also be able to analyze the public's use of the space (including identification of available space, average time of occupancy) identify meters in need of repair, coin boxes in need of collection, meters out of service and parking spaces occupied in violation of regulations. All of this information, ideally, should be available to parking management and to all who use the plant for whatever purpose (e.g. customer or maintenance personnel) in near real time. To date, no system has been developed which does this. While technology (a timer and coin discriminator) allows the system of dispersed assets to operate in an understandable way for all of its users and also allows for more effective management of a limited resource, it also requires that inoperable meters be repaired and that monies be collected. The additional personnel requirements to address these needs often require a layer of management personnel to support their operations.

Diverse User Groups

The users of the information able to be developed as to parking spaces and the particular pieces of information of use of them are extraordinarily diverse. They include the public—the people wishing to make use of the space who want to know availability, location, proximity and terms of what is, in economic reality, a short term lease including permitted length of stay and changes; the business community who want to know patterns of usage from the point of view of maximizing turnover of prospective customer base; the enforcement personnel—the people charged with enforcing the regulation adopted as to the space; the maintenance personnel—tasked with ensuring the operability of the physical assets; the collection crews—responsible for actually collecting the revenues from the parking plant on a schedule which ensures no revenues are lost from collection bins being filled to capacity; management—charged with ultimate responsibility for all of the foregoing as well as maximization of revenues consistent with addressing the underlying concern of the public to best allocate a limited resource for the best good of the group.

Not only are the demands of these various groups best served if they have up-to-the-minute information as to the parking plant, there are other uses they and others may make of such information which are not directly parking related, e.g. better information as to collection cycles may permit more efficient money management by a municipal treasurer; knowledge of meters out of order may result in more effective supply chain management of inventory.

SUMMARY OF INVENTION

Remote Asset Management

Parking spaces are not a standard resource. They are numerous and dispersed geographically. This fact makes them more difficult to manage. The difficulties presented by the nature of such assets require the use of emerging technologies to reduce inefficiencies and provide the proper distribution of the asset to stakeholders.

A field of management science—Remote Asset Management—is devoted to the solution of such problems. This refers to the use of intelligent devices that can perform four basic functions:

1. Sense, collect, record and display data regarding the current environment relevant to the management of an asset;
2. Analyze the data collected and create actionable outputs responsive to the needs of users;
3. Communicate with other necessary system elements; and
4. Receive feedback and perform requested operations Applying this concept to the parking space asset and then involving available technologies to enable the highest degree of efficiency in management of that asset provides a solution to problems that could not otherwise be managed.

Supporting Assets

In order to provide the needed management of the parking space asset, a number of supporting assets are needed to achieve the intelligence and communications Remote Asset Management requires. These components are then also further assets to manage remotely and need to be built and/or integrated on the same concepts of Remote Asset Management. This includes the personnel deployed to perform specific enforcement and maintenance tasks.

A patented vehicle detection system, namely U.S. Pat. No. 7,014,355, issued 21 Mar. 2006, entitled: Electronic Parking Meter System and owned by the same assignee as the present invention, together with a proprietary system for which patent application, namely U.S. patent application Ser. No. 11/179,799, entitled: Smart Meter Patent System, published as US-2007-0016539-A1 on 18 Jan. 2007 and owned by the same entity as the assignee of the present application identifies all information as to a parking space including when a vehicle enters or leaves a parking space, how long the vehicle has been in such space, whether the parking meter associated with the space is in good operating order, whether the requested charge for occupancy of the space has been paid, whether the vehicle is in compliance with any other regulations as to the space, whether a violation has occurred or is about to occur, and status of usage of the collection mechanism. This information is collected, stored and then transmitted, to a central command and control interface which, making use of proprietary software, collates, analyzes and transmits reports to a display, in near real time, which permits the end user of the data to access and make use of the data or any part of it in whatever fashion, including wireless communications devices, handheld computer computers, cell phones, electronic signage or other response, best fits his needs or wishes. In brief, this system not only monitors and reports on the status of the parking plant but permits one to control its uses and to access the information so displayed and use it either in response to its initial presentation or for other uses including transmission to third parties. All parties involved in parking, from whatever point of view, will be able to monitor the status of all parking spaces in near real time to make use of the space and the information developed on an interactive basis in accordance with their own needs, requirements or wishes.

These uses include the elimination of data entry for ticket writing, identification of empty spaces, storage of detailed transactional data of occupants including arrival, departure, time of occupancy and payment events which permit one to use the collected transactional data to determine the incidence of violation occurrence (including type of violation, time of occurrence, status of violation (citable or transpired) and length of violation), log of maintenance events and transmission of maintenance events to management, permitting the creation of work orders to respond to maintenance events and requirements, the distribution of electronic work orders automatically and the maintenance of crew inquiries and supervisor grouping and development with real-time updates from the field as to maintenance work performed, real-time updates as to equipment out of service, the distribution of electronic enforcement orders (automatic as well as the result of enforcement officer inquiry), use of collected transactional data to eliminate data entry for ticket writing, real-time updates from the field as to cited violations, use of license plate recognition systems and real-time updates of cited violations, real-time matching of violation, citation and maintenance records for adjudication of parking tickets, use of GPS for workforce location to enhance deployment and make better use of their services, use of work order/citation updates to locate and employ personnel, use of telemetric assets to locate and deploy personnel, personnel performance measurements as to number of orders addressed and response time as to orders for repair, electronic updates to permit programming, wirelessly, of detector settings and logic, wireless settings and logic and meter settings and logic as to hours and days of operation, rate per hour, rate structure and adjustments of rate both in real time progression and from time to time, acceptable forms of payment, public interface for parking availability including trip planning (available parking near destinations), available parking near current location, information regarding parking locations including policy and time limits and payment options, use of historical data to permit management to develop models for routing for enforcement, collection and maintenance, as well as use of historical data to model policy change effects and changes in rate, detailed summaries of individual spaces as to occupancy, duration, violations and revenues and detailed information on the specific parking event for which a citation was issued and use of GPS as appropriate in connection with all of the foregoing.

BRIEF DESCRIPTION OF THE DRAWINGS

The above objects features and advantages of the invention are readily apparent from a consideration of the following description of the best mode of carrying out the invention when taken in conjunction with the following drawings representing the bet mode of carrying out the invention, wherein.

DETAILED DESCRIPTION OF THE INVENTION

The current invention consists of both the integration of some or all of the components in the embodiment of the invention disclosed herein and the methodologies of management by any or all of the users described herein that are enabled by such integrated parking management system.

In one embodiment of the invention, implementation of the parking system uses battery-powered client radios (radios installed by the management of the parking system) installed in parking meters that then communicate with Nodes (also referred to as Collectors). The nodes form into a network that provides the communications backbone for data that is communicated from the Parking Meter Client Radios.

Figure 1:
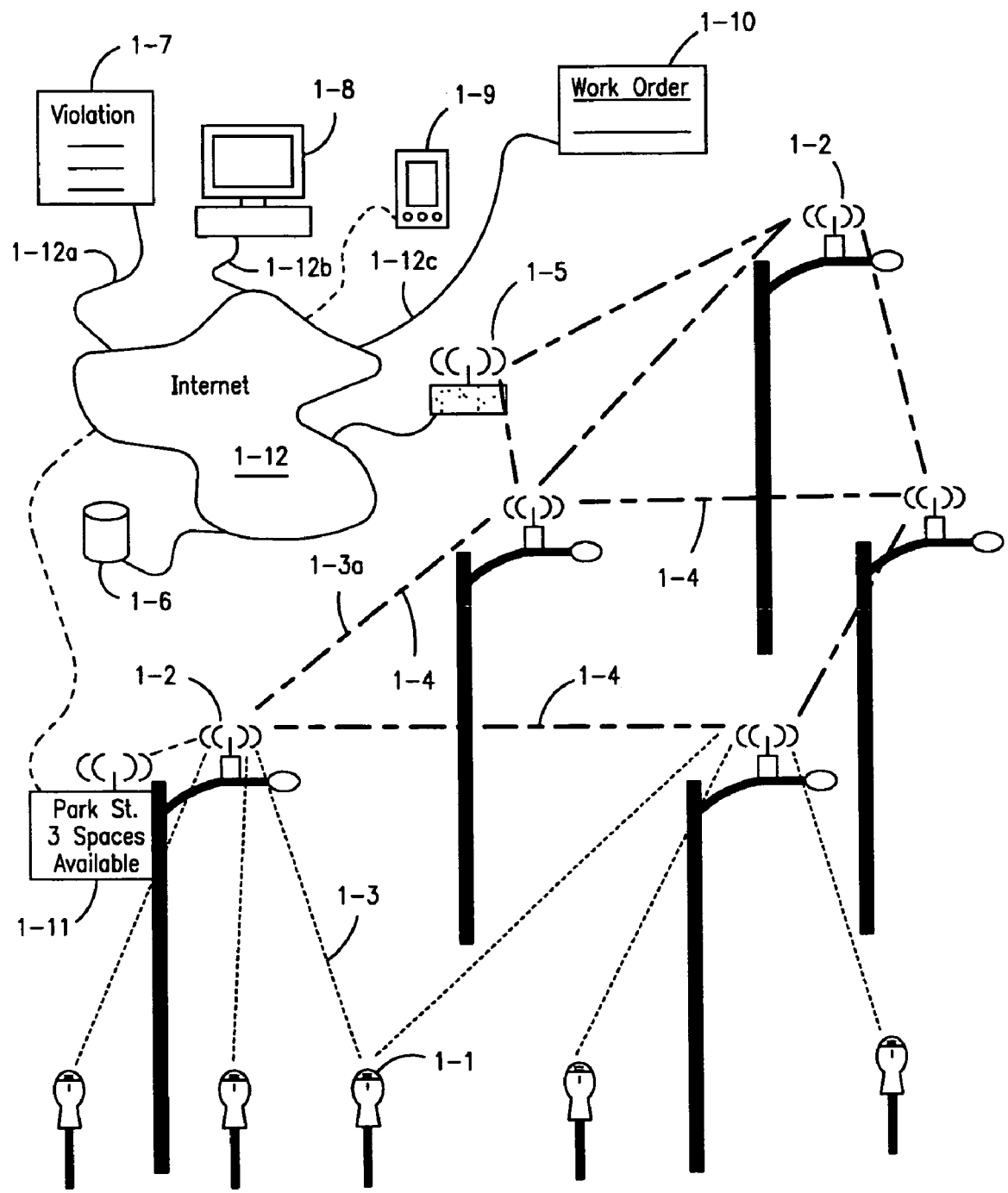
FIG. 1 is a diagram of a preferred embodiment of a parking system incorporating battery powered client radios installed in parking meters and providing data communication between the parking meters and various peripheral components associated with the parking system.

The parking system illustrated in FIG. 1 shows parking meters (1-1) embedded with battery-powered client radios. Data to and from the parking meters (1-1) is communicated by a wireless link (1-3) to a collector node (1-2). The collector node (1-2) communicates wirelessly (1-3*a*) with other collector nodes (1-4) to move data to and from a gateway (1-5). The gateway (1-5) is connected to the internet by a cellular modem, direct connection or other means and moves data to a storage device and web portal (1-6). The storage device and web portal (1-6) then creates reports for use by a parking manager (1-8), communicates to parking enforcement (1-7), communicates with the public (1-9) about the availability of parking spaces by cell phone, PDA, or on-street signage (1-11) or to maintenance teams (1-10) via, for example the internet (1-12) and communication links.

Figure 2:
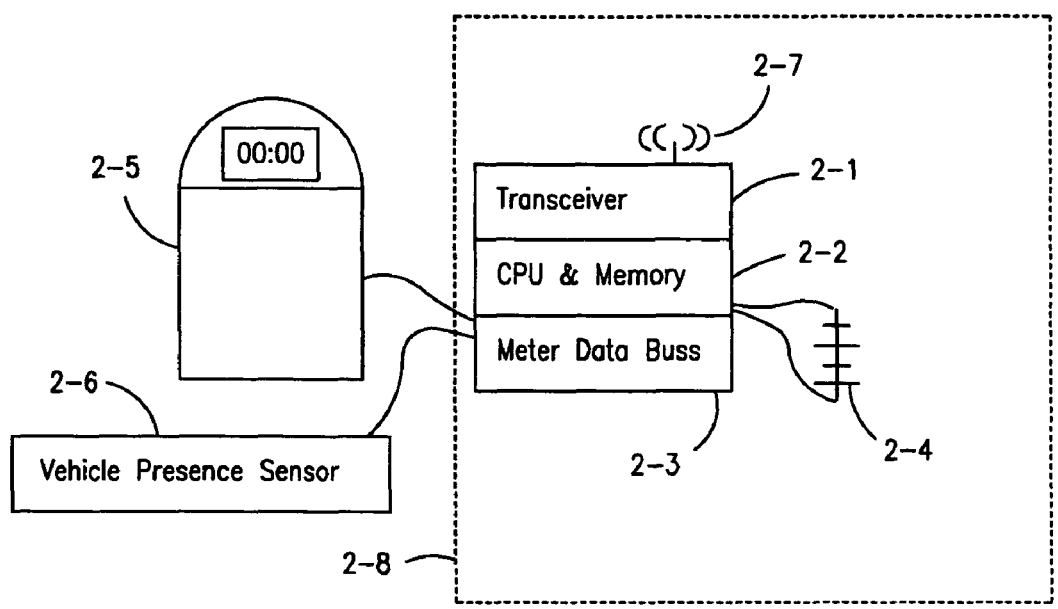
FIG. 2 is a diagram of an integrated communications module housed in a parking meter enclosure for each of the parking meters of FIG. 1.

One component of the parking system shown in FIG. 1 is the wireless client node located in the parking meter shown in FIG. 2. Parking meter (2-1) is a device which displays time, takes money in various forms, and indicates violation condition in the various parking spaces (not shown) of the parking system. Modern parking meters are electronic and record and store data relating to the transaction record and the ability to receive instructions about new hours of operation and parking rates and terms. An Integrated Communications Module (ICM) (2-8) includes a Meter Data Buss (MDB) (2-3), CPU and Memory (CPU & M) (2-2), Transceiver (2-1), Antenna (2-7) and power supply (2-4) placed in communication with a Vehicle Presence Detector (VPD) (2-6) and the Parking Meter (2-5). ICM (2-8) is located in a common housing with the Parking Meter (2-5) and VPD 2-6.

The MDB (2-3) permits communications between the principle components of the system and permits communications between the remaining systems shown in FIG. 2 if any one component fails. The CPU & M (2-2) communicates internally with the transceiver (2-1) and MDB (2-3), and by extension with the VPS (2-6) and the Parking Meter (2-5) as shown in FIG. 2. The Transceiver (2-1) is in communication with the CPU & M (2-2) and Antenna (2-7) which, in turn is in communication with the Collector Nodes (1-2) (FIG. 1). The ICM (2-8) receives data from and sends data to the Parking Meter (2-5), the VPS (2-6) and a Collector (1-2) or a plurality of Collectors (1-2) (FIG. 1).

Figure 3:
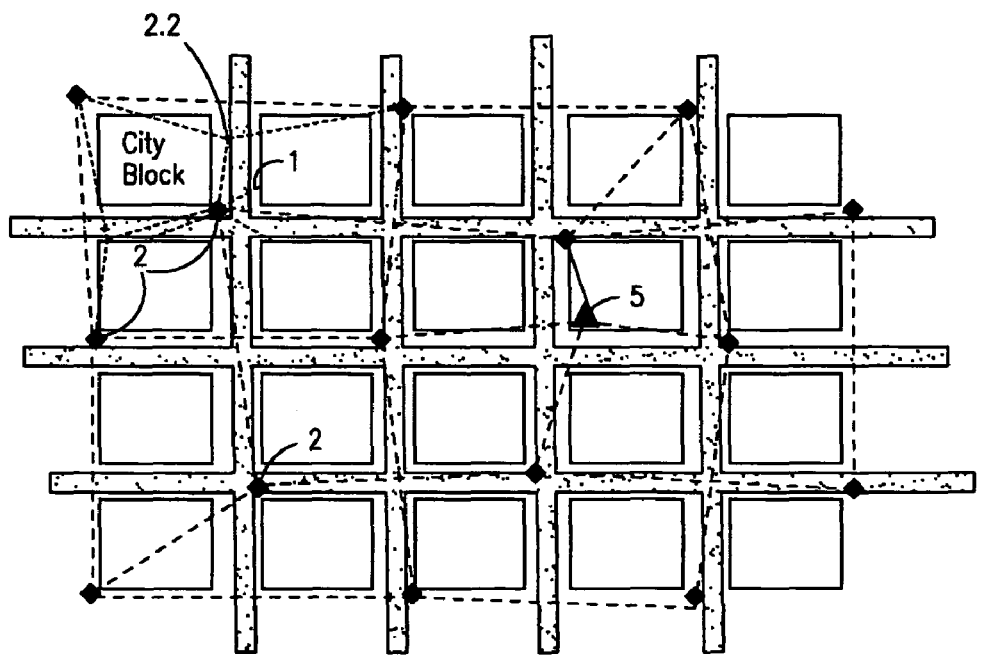
FIG. 3 illustrates an array of collector nodes in an urban setting n accordance with the parking system shown in FIG. 1

FIG. 3 illustrates an Array of Collector Nodes in a typical urban setting. Collectors (1-2) provide the communications backbone of the system. Collector Nodes (1-2) are in communications with other Collector Nodes (1-2) as shown in FIG. 3. A Gateway (1-5) or multiple Gateways, and Parking Meters (1-1), or a plurality of Parking Meters 1-1. Other Parking Meters (1-1) in turn may be in communications with a plurality of Collector Nodes (1-2).

Collector Nodes (1-2) are typically located on street lights, traffic signals or other structures located approximately 3-10 meters above street level to facilitate communications.

Gateways as used herein link the Telemetry system to the outside world and in the present invention the Gateway is a Computer a Transceiver, and a means of communicating with either the internet or a program that provides monitoring and control of the parking plant.

Components

Another embodiment of the invention includes a centralized core computing system (see FIG. 4) that acts as a command and control center and interface for all parking event notifications, user information requests as well as the logging and validation of all communication transmissions made between individual components making use of the data collected from patent vehicle detectors and transmitted to such system. With respect to FIG. 4, The Space Monitoring and Metering System (SPMMS) (4-1) is connected via any communication network available to the Command and Control Interface (CCI) (4-2). When events occur that represent a change in the status for the space being monitored, or the equipment in place to do so, a communications session is opened with the CCI (4-2). During this communications session any data related to the change in status is transmitted to the CCI (4-2). This data includes the type of change, the space or assist involves, the date and time of the change, details particular to that status change (type of violation, failure, etc.). Also during this communications session any additional data stored in the form of transactions is sent to the CCI (4-2) for use in historical analysis of the data. These data include the individual events needed by the data analysis engine to generate statistics for historical reporting. In the case of either a violation state or a maintenance alert, the CCI (4-2) sends a message to the appropriate Enforcement Personnel (4-3) or Maintenance Personnel (4-5).

Upon arriving at the space in question, the worker can communicate directly with the (SMMS) (4-1) using wired, wireless or optical communications. This communication will identify the space in question directly to the work order or violation alert the worker is on site to address. Once identified, the electronic work order or citation can be populated with appropriate information and time-stamped as to the worker's response to the alert. Parking Staff Supervisors (4-7) can also access the CCI 4-2 via web portal. Through this portal the supervisor can manually assign open work orders and alerts, check on the current or last known location of available personnel, generate reports on open orders or alerts and examine historical performance reports. Parking Policy Makers (4-8) can access the web portal to obtain historical reports on space usage or to model policy changes. The CCI (4-2) generates reports from data collected by the SMMS 4-1) and analyzed by the Data Analysis Engine (not Shown) within the CCI (4-2). Changes to policy can then be deployed by either the policy makers or parking management staff by instructing the CCI (4-2) to issue programming updates to the SMMS (4-1). These are transmitted to the spaces and all related signage The Controlling Entities Accounting Personnel (4-9) access the CCI (through the web portal to obtain reports on monies collected from the meters. Adjudication Personnel (4-10) use the web portal to access specialized reports combining the violations, citations and maintenance records stored in the CCI 4-2) to determine the validity of citations issued to motorists. Traffic Control Personnel (4-11) use the web portal access to determine links between parking availability and traffic congestion and Emergency Services (4-12) to access the same portal to assist in the clearing of vehicles from no parking areas from a centralized dispatch center. The Parking public (4-13) can use either the web portal or a connected intermediary service to get information regarding available parking spaces or to make payment for such spaces. Alternative Payment Clearing Houses (4-14) receive exported data directly from the CCI (4-2) to process credit, debit or smart card payments. Citation Collection Agencies (4-15) access web portal and/or receive exported data directly from the CCI for processing past-due citations. Towing Contractors (4-16) receive alerts from the CCI (4-2) regarding vehicles due to be impounded and their current location as enforcement officers submit electronic citation information or from Emergency Services (4-17).

Figure 5:
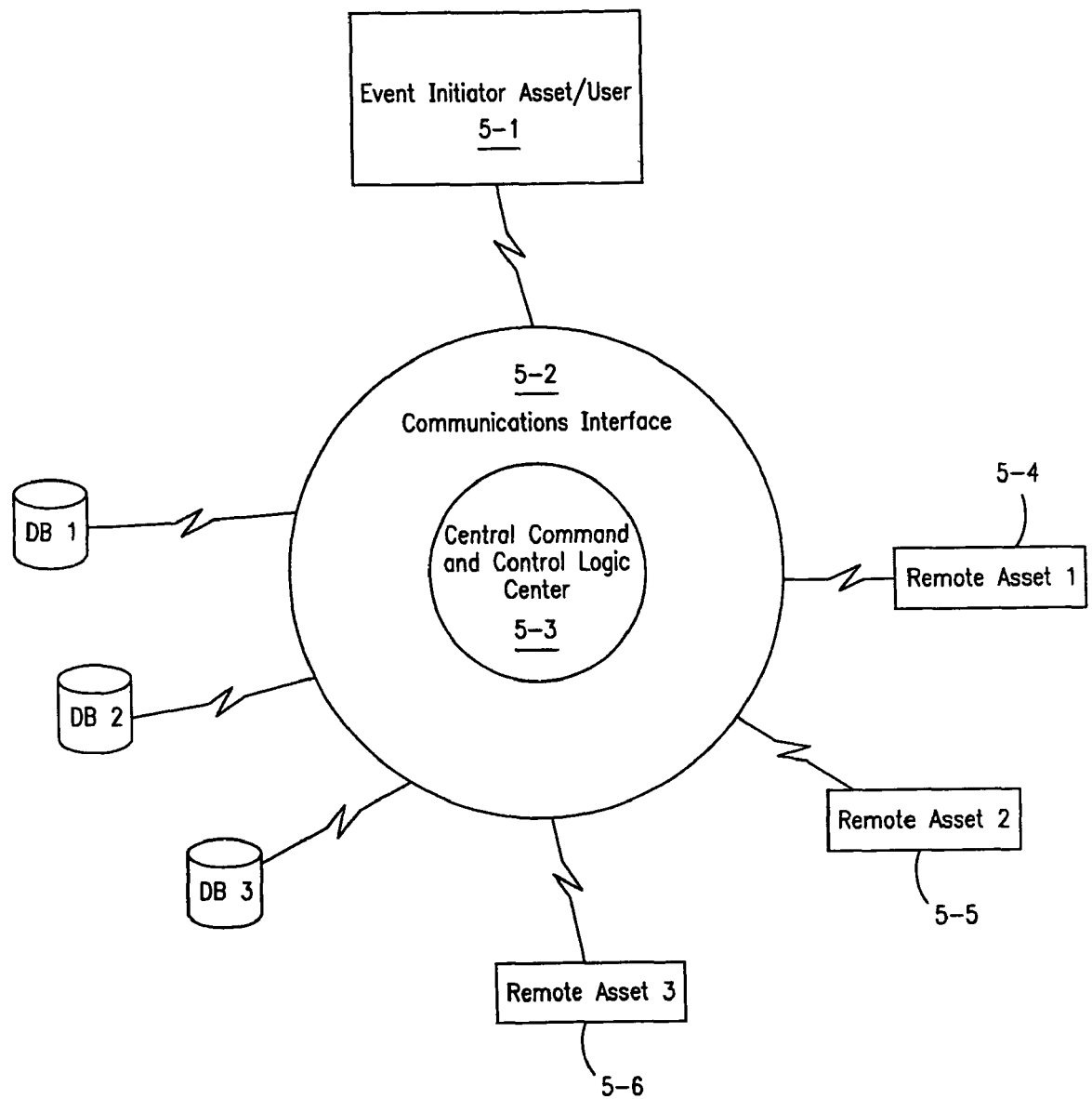
FIG. 5 shows how an event or used request is processed using the Central Command and Control Logic Center (CCCLC) and its connection with various remote assets and DBs via a communications interface.

FIG. 5 illustrates how an event or user request is processed. The request is generated by either the sensing of a parking asset status change or a user making a specific request. The Event Initiator Asset/User (5-1) sends a message to the CCI (4-2). The request is interpreted by the Communications Interface (5-2) and processed by the Central Command and Control Logic Center (CCCLC) (5-3). The CCCLC (5-3) is programmed to perform predefined actions for each request made. In so doing, the CCCLC (5-3) may query one or more Remote Assets (5-4, 5-5, 5-6) as well as one or more Databases (DB-1, DB-2, DB-3) to obtain additional information. The CCCLC's) (5-3) programming may also send instructions to one or more Remote Assets (5-4, 5-5, 5-6) as a result of the request. All requests made by the CCCLC (5-3) for action or further data are passed through the CI (5-2) to interpret the request or command into a protocol understood by the intended asset or database. Once all necessary information is compiled it is sent to the CI (5-2) to return a resulting confirmation or report to the initiating asset or user via the Event Initiator Asset/User (5-1).

Figure 6:
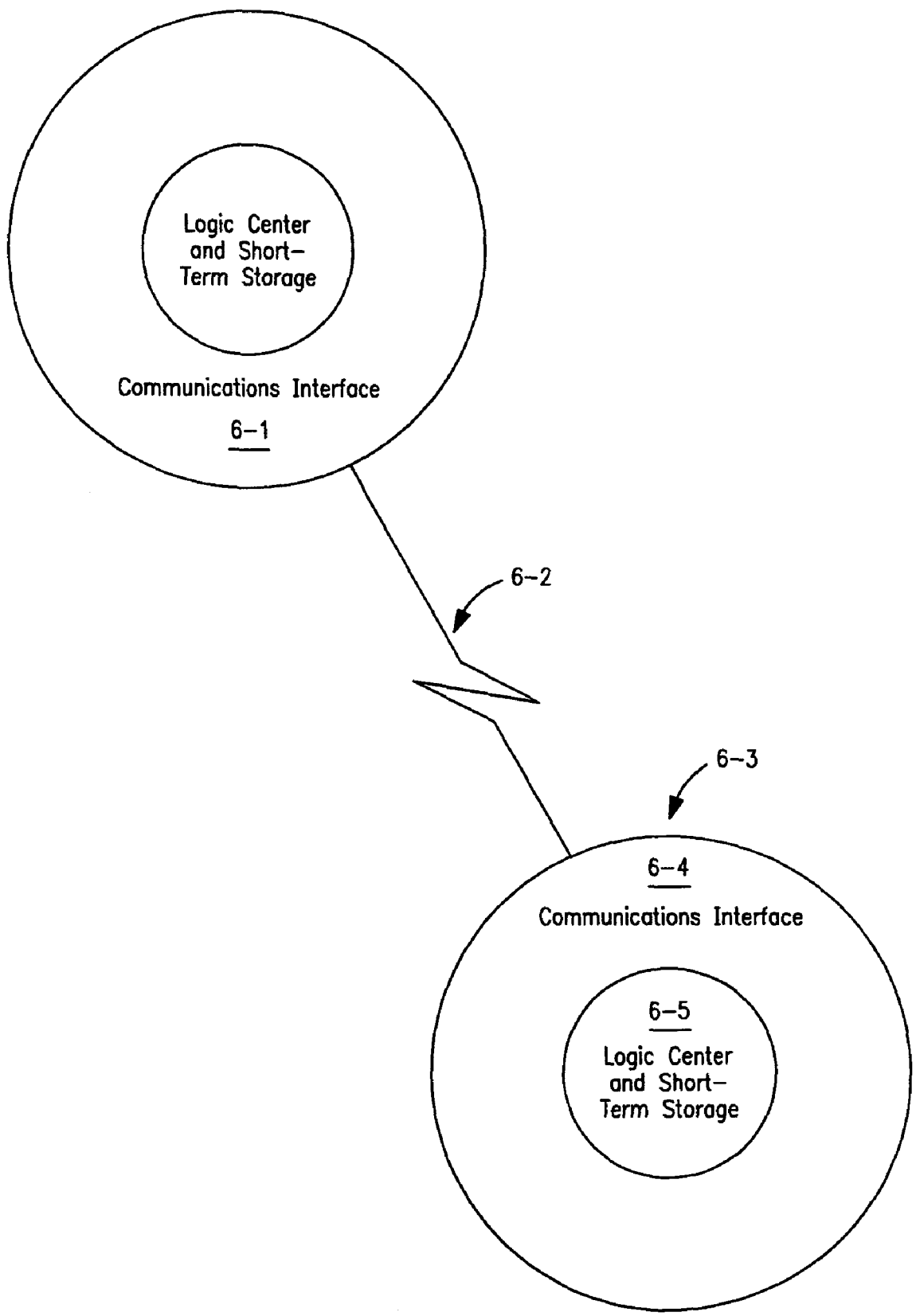
FIG. 6 illustrates how two remote assets communicate directly as opposed directing communication through the CCI.

FIG. 6 illustrates how two remote assets communicate directly as opposed to directing communications through the CCI (4-2). The CI (6-1) interprets the communications for transmission over the proper connection and protocol (6-2) for the receiving device (6-3) This message is received and interpreted by the receiving device's Communication Interface (6-4) and passed to its Logic Center and Short-Term Storage (LCSTS) (6-5). The receiving device acknowledges the receipt of the message to the initiating device and both devices record the fact of the transmission in temporary storage. These details are eventually sent back to the CCI (4-2) for permanent storage in the centralized communications logs.

U.S. patent application Ser. No. 11/179,779, filed 13 Jul. 2005 and still pending, discloses a vehicle detection system identifying information with respect to individual parking spaces including when a vehicle enters or leaves a parking space, how long the vehicle has been in such space, whether the parking meter associated with the space is in good operating order, whether the requested charge for occupancy of the space has been paid, whether the vehicle is in compliance with any other regulations as to the space, whether a violation has occurred or is about to occur and the status of usage of the collection mechanism.

Figure 7:
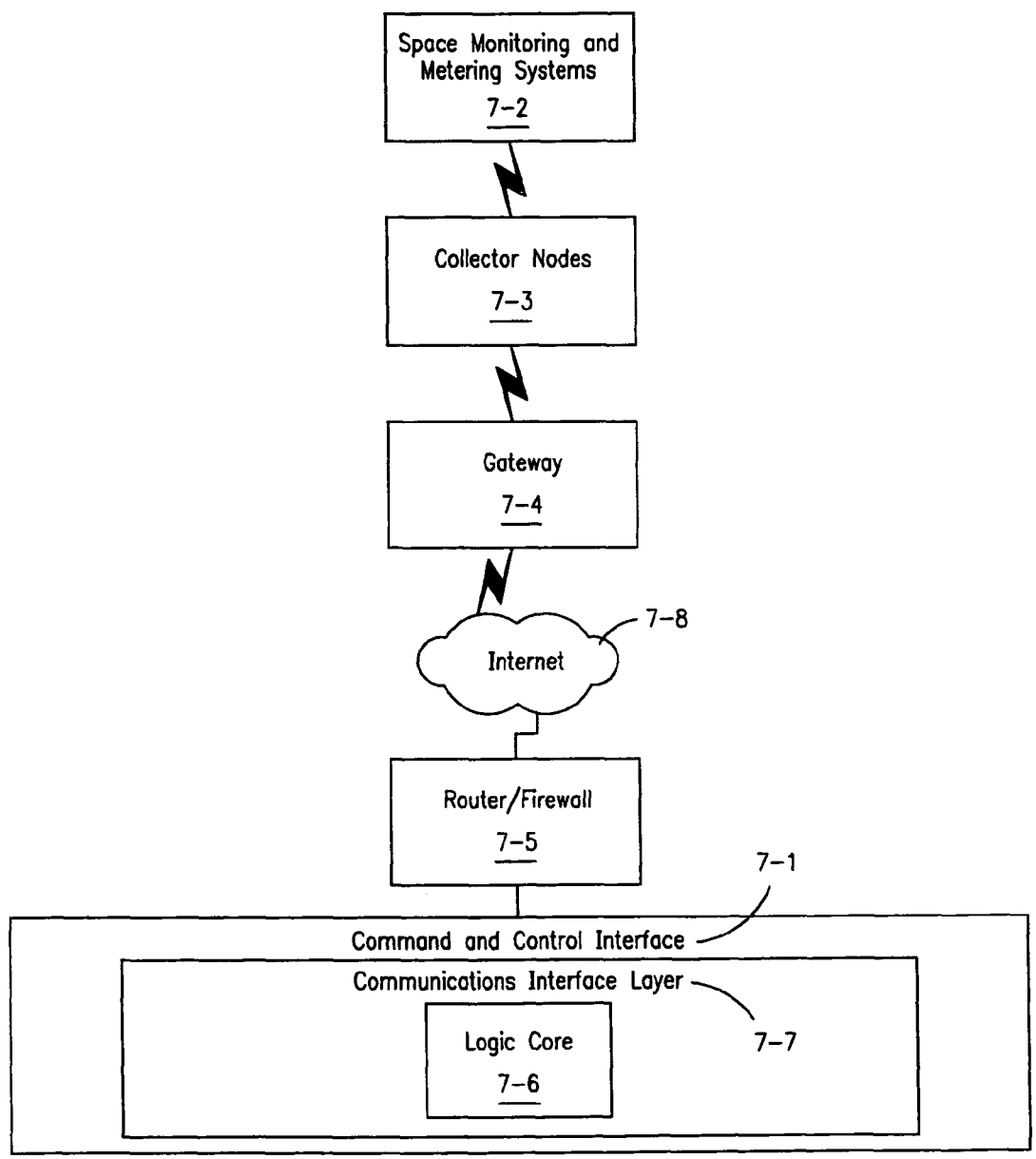
FIG. 7 shows the transmission of data from the Space Monitoring and Metering Systems back to the Command and Control Interface.

The present invention collects, stores and transmits the above data to a central command and control interface [(CCCI) in FIG. 7], which uses proprietary software, collates, analyzes and transmits reports to a display, in near real time, thereby permitting the end user of the data to access and make use of the data or any part of it in whatever mode, of communication including wireless communication devices, handheld computer, cell phones electronic signage or other modes of expression that best suit the needs or desires of the end user.

FIG. 7, shows the transmission of data from the space SMMS (7-2) back to the CCI (7-1). The monitoring and Metering Systems transmit data to Collector Nodes (7-3) dispersed throughout the area in which meters are deployed. The Collector Nodes (7-3) form a mesh network to transmit data to one or more centralized Gateway devices (7-4). These Gateway devices (7-4) are connected to the Internet (7-8) and are able to transmit data over the internet to a specific address. A Router/Firewall device (7-5) receives data delivered to that address and prevents unwanted access to the CCI (7-1). As each SMMS (7-2) is identified with an address of its own, messages can be sent along the reverse path from the CCI (7-1) as well, Command and Control Interface The Command and Control Interface (CCI) (7-1) is computerized dataflow system. Functionally, it consists of a logic core ((7-6) and a communications interface layer (7-7).

Logic Core

The logic core (7-6) of the CCI (7-1) is a programmable set of rules to be applied to parking events and requests as the CCI (7-1) receives notification of them. The rules are both pre-defined and user-definable in nature. The rules will dictate how the event or request will be handled. The first step of the rules will be to parse the data stream being received into applicable data elements for forwarding to the appropriate databases or management systems. The rules will define for each data stream markers upon which the received data stream is to be parsed. The rules will also dictate which system is to receive those parsed elements and if returned data is expected. Each data stream will then be passed to the specific database or management system and confirm receipt of the full data stream. The communications with each element will be logged in a separate database for historical tracking and internal diagnostic reports. If the rules dictate that a response from the defined supporting system is expected, the CCI (7-1) will wait for that returned data stream and store it locally. Once each parsed data stream is processed, any returned data streams are compiled and passed on to the communications interface layer 30 for delivery to the requesting user or remote electronic parking asset.

Communications Interface Layer

The communications interface layer (CIL) (7-7) is a multi-faceted shell that can be connected to multiple physical connections and using multiple protocols. The interface Layer (7-7) includes a presentation engine which generates interactive documents for display in web browsers when applicable. It also allows for the simple exchange of data streams to remote devices by way of cellular, satellite or other long range wireless connections. The communications interface layer (7-7) uses routing tables to track both the means and protocols to be used when communicating with each device.

Data Transmission

The primary operation of the system is to transport data from one location to another where it can be acted upon by the receiving device or user. Data is transmitted using a pre-defined packet structure. This structure includes information identifying the origination point of the message, a packet number, status data for the device and payload data. The origination id is used to identify for the CCI (7-1) what device sent the message. The packet number is used to re-compile data packets if multiple packets are needed to convey all the necessary data in the proper order. This is necessary in case communications latencies cause the packets to be received out of order. The device status data consists of several key pieces of information used by the CCI (7-1) to monitor the operating status of the reporting device. The payload portion of the packet is the detailed data being sent to the CCI (7-1) for processing.

To transfer data, the communications interface CCI (7-1) receives the data to be transmitted and the device address to which it is to be delivered. Based on defined routing tables, the means of communication and protocols are determined and the payload data formatted for delivery. The delivery of information may be addressed to one individual device or a group of devices. Once received, the packets are re-ordered as necessary and interpreted by the logic of the receiving device(s). The payload of the data packet will tell the receiving device what action to take and which parameters to apply.

User Interface

In order for human users to interact with the system, the CCI (7-1) includes capabilities to produce interactive web page documents that can be accessed by users over any internet connection. The invention includes several different types of interfaces.

Figure 8:
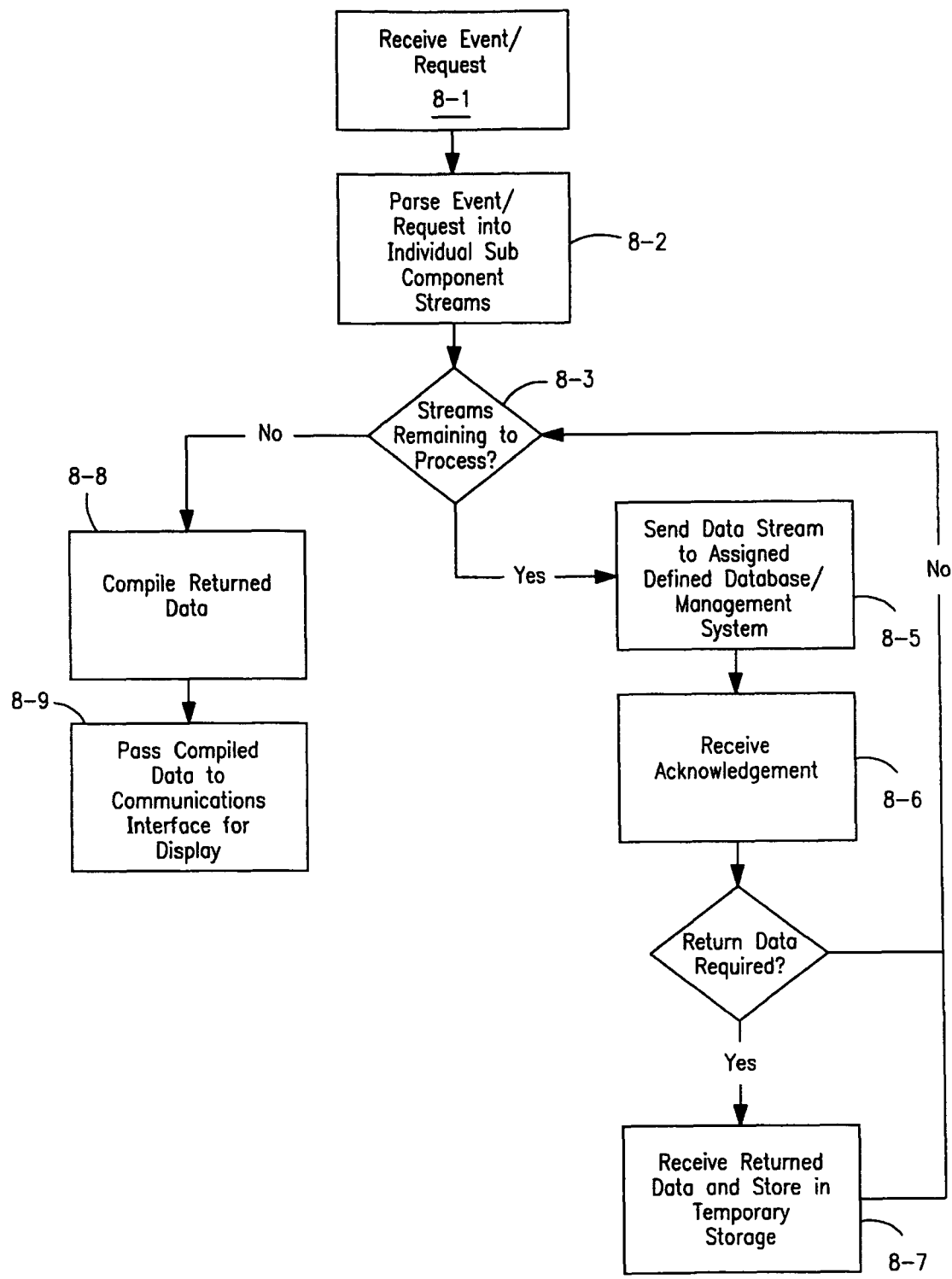
FIG. 8 illustrates the basic process used by the Command and Control Interface to process incoming requests and status updates.

FIG. 8 illustrates the basic process by which the CCI (7-1) processes incoming requests and status updates. The event is received by Receive Event/Request (8-1) to start the process. The CIL in the Parse Event/Request (8-2) parses the data stream to single-out the various data items included in the streams. The CCI (7-1) then enters a processing loop (8-3) until each of the various data items have been processed. Each data item is formatted and sent to the database management system (8-5) defined in the Logic Core's programming and acknowledgement is then received from the data base or system. If the Logic Core's programming indicates that data is to be received from the database or management system (8-7). The CCI interface awaits that returned data (8-7). Once all of the data items have been processed, the programming of the logic core dictates a means by which any returned data is to be compiled (8-8) and the resulting compilation of data is passed to the Communications Interface Layer for delivery to all of the pertinent assets and users (8-9).

Figure 9:
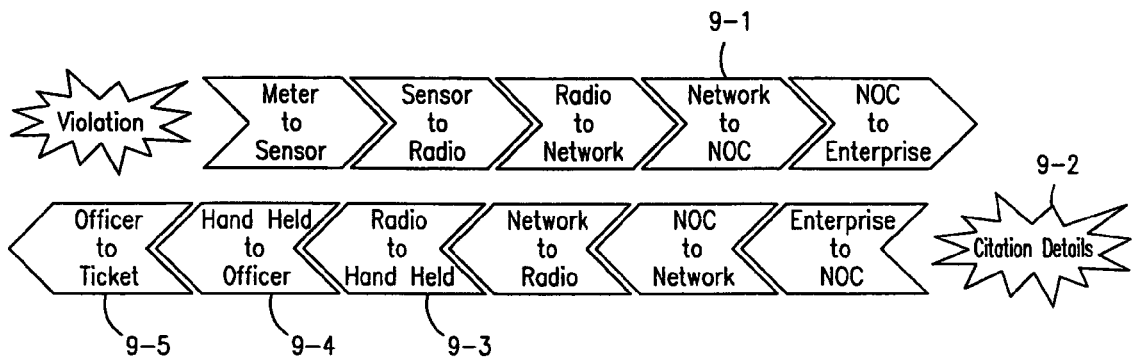
FIG. 9 illustrates communication between various components of the parking system to produce a citation for a parking violation detecting by the parking system.

FIG. 9 illustrates the processing of a violations event. The event is reported by the SMMS (4-1) and passed through the telemetry (9-1) back to the CCI (7-1). The Logic Core (7-6) process the data received and creates a Citation Detail (9-2) This data is then transmitted via a wireless communications network (9-3) to an enforcement officer's handheld computer (9-4) where a citation (9-5) is written once the officer reaches the space in question.

Figure 10:
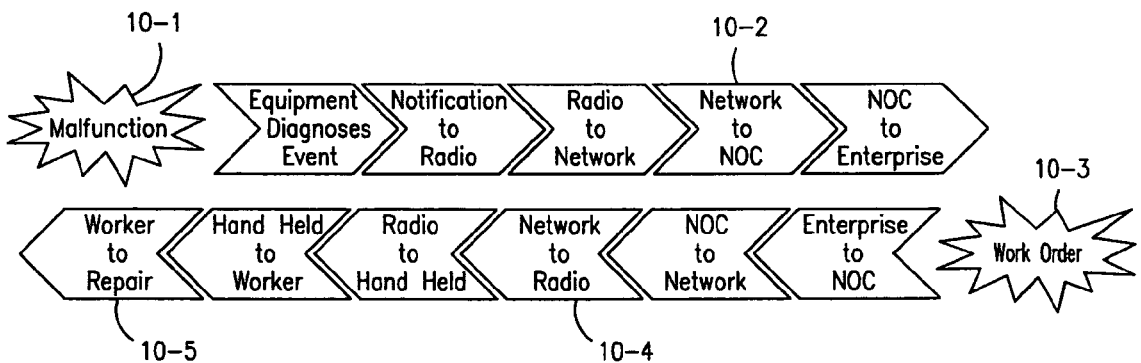
FIG. 10 illustrates communication between various components of the parking system to provide a work order upon detection of a malfunction in the parking system.
Figure 11:
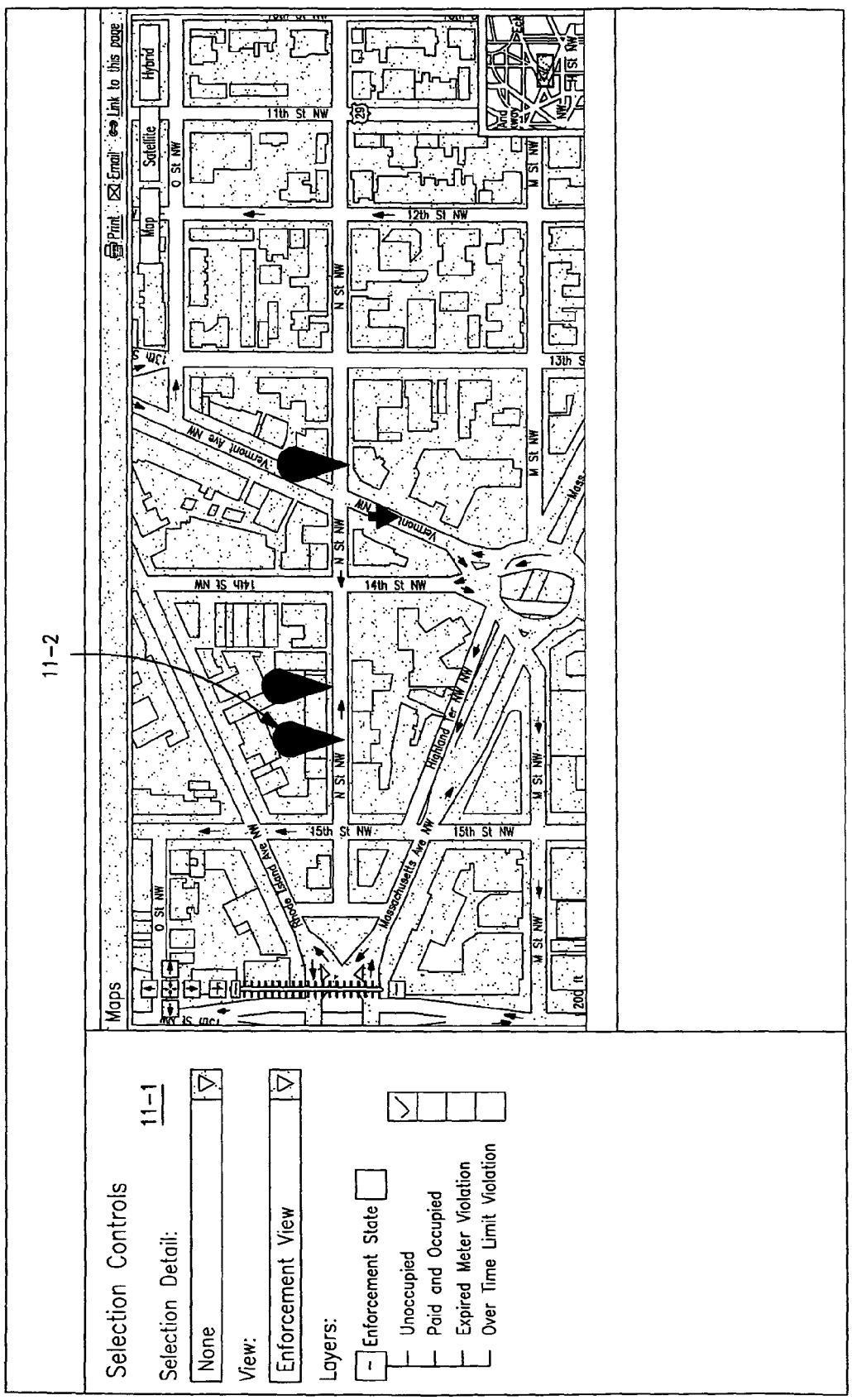
FIGS. 11-12 illustrate the basic format of a geographical information system user interface.

FIG. 10 illustrates the processing of a parking asset malfunction (10-1). The malfunction is reported by the SMMS (4-1) and passed through the telemetry (10-2) back to the Command and Control Interface. The Logic Core processes the data received and creates an electronic Work Order (10-3). This is then transmitted via a wireless communications network (10-4) to a maintenance worker's handheld computer. The worker then performs the repair and completes the electronic Work Order (10-5). In completing the Work Order, the worker lists any parts used and places a time stamp on the repair made. This information can then be transmitted back to the CCI Geographical Parking Information System FIGS. 11-15 illustrate the basic format of a geographical information system user interface. The interface has many views and filtering levels. FIG. 11 shows a view focused on enforcement status. The selection controls (11-1) allow the user to filter the view according to specific statuses. In this case, the view is filtered to show only unoccupied spaces. These are indicated by icons (11-2) on the map.

Figure 12:
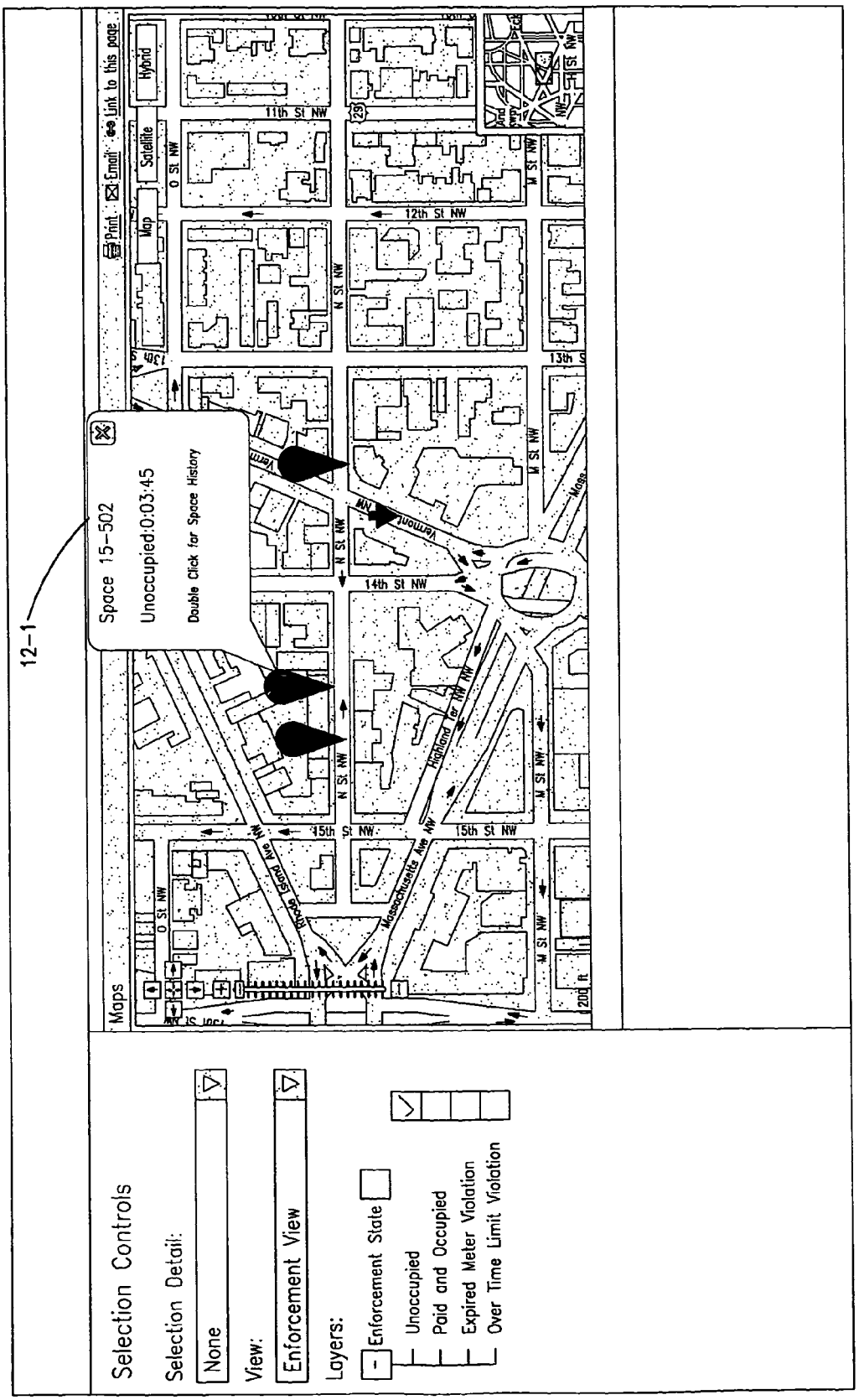

FIG. 12 shows the same view as FIG. 11, however in FIG. 12 a user has clicked on one of the icons. When this happens a balloon or window (12-1) opens to provide further details regarding the space represented by the icon.

Figure 13:
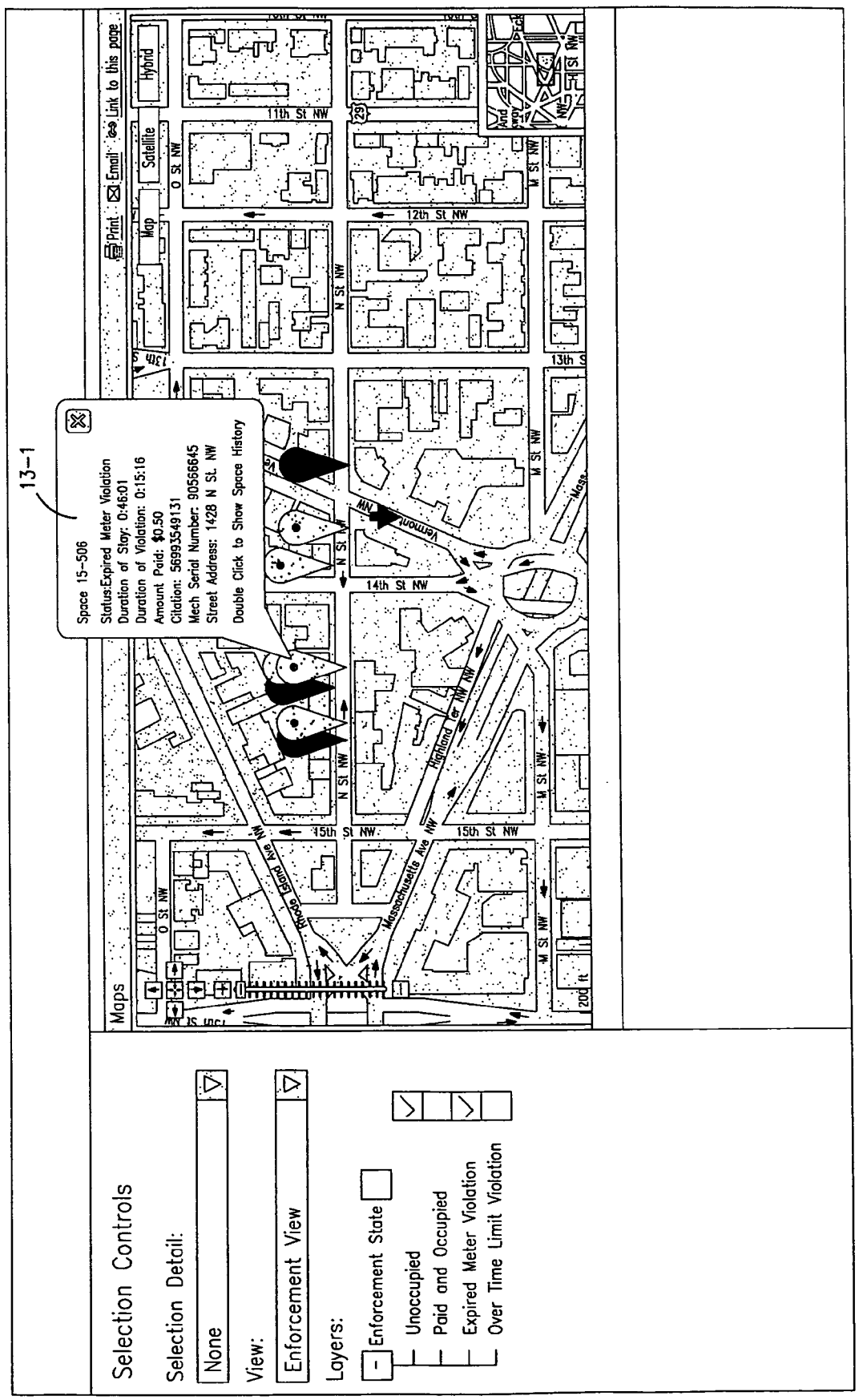
FIGS. 13-15 depict the use of a GPS system to locate and deploy personnel.
Figure 14:
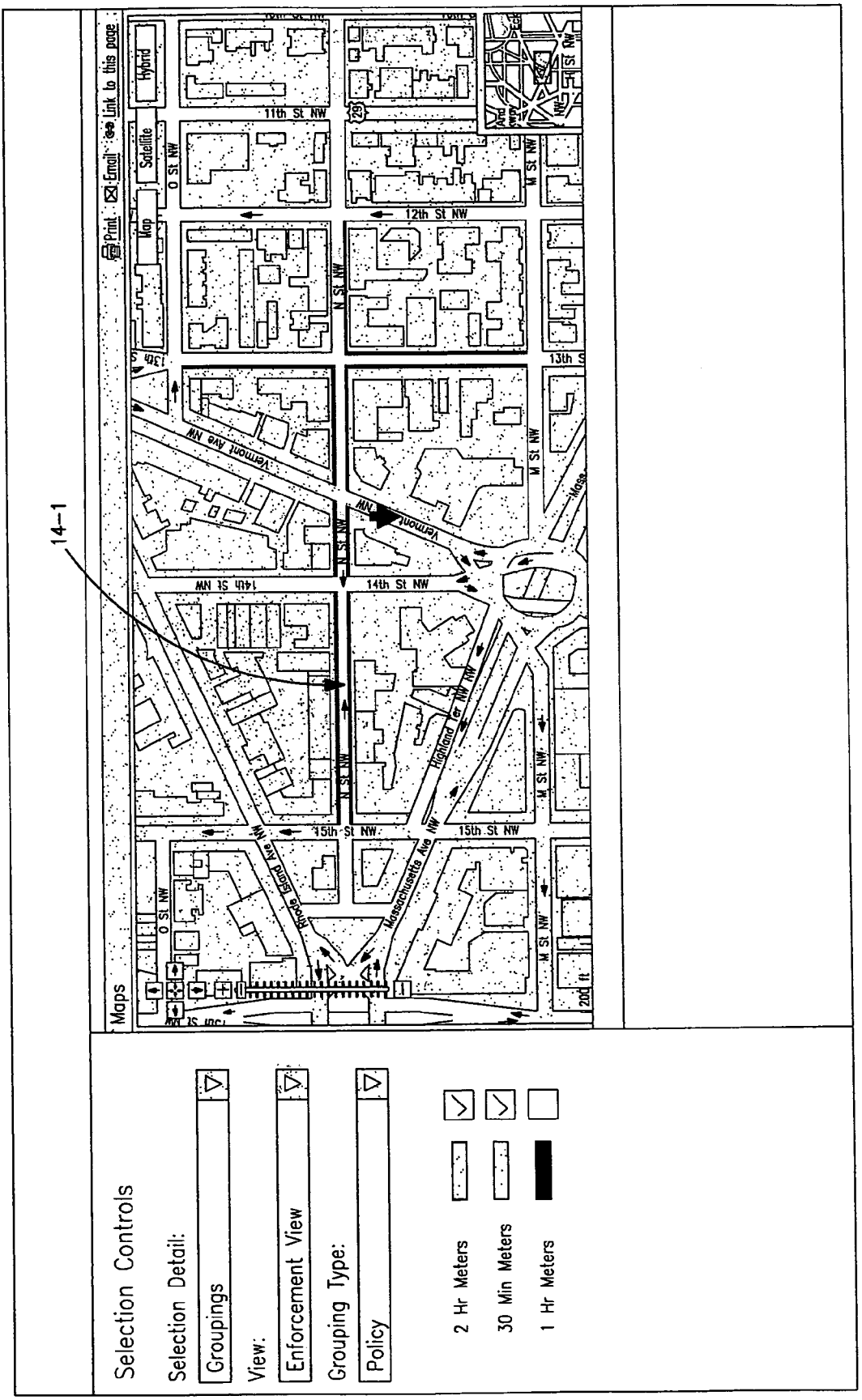

FIG. 13 is similar to the FIGS. 11 and 12, but the filter has been expanded to show both unoccupied spaces and those with an expired meter violation The detail balloon (13-1) gives information about both the space and the violation occurring therein. FIG. 14 is a view of the GIS that represents user defined groupings of spaces. In this case, the user as defined groups based on the enforcement policy in effect at the spaces. The selected policies are indicated by the colored line (14-1) or some other visual means.

Figure 15:
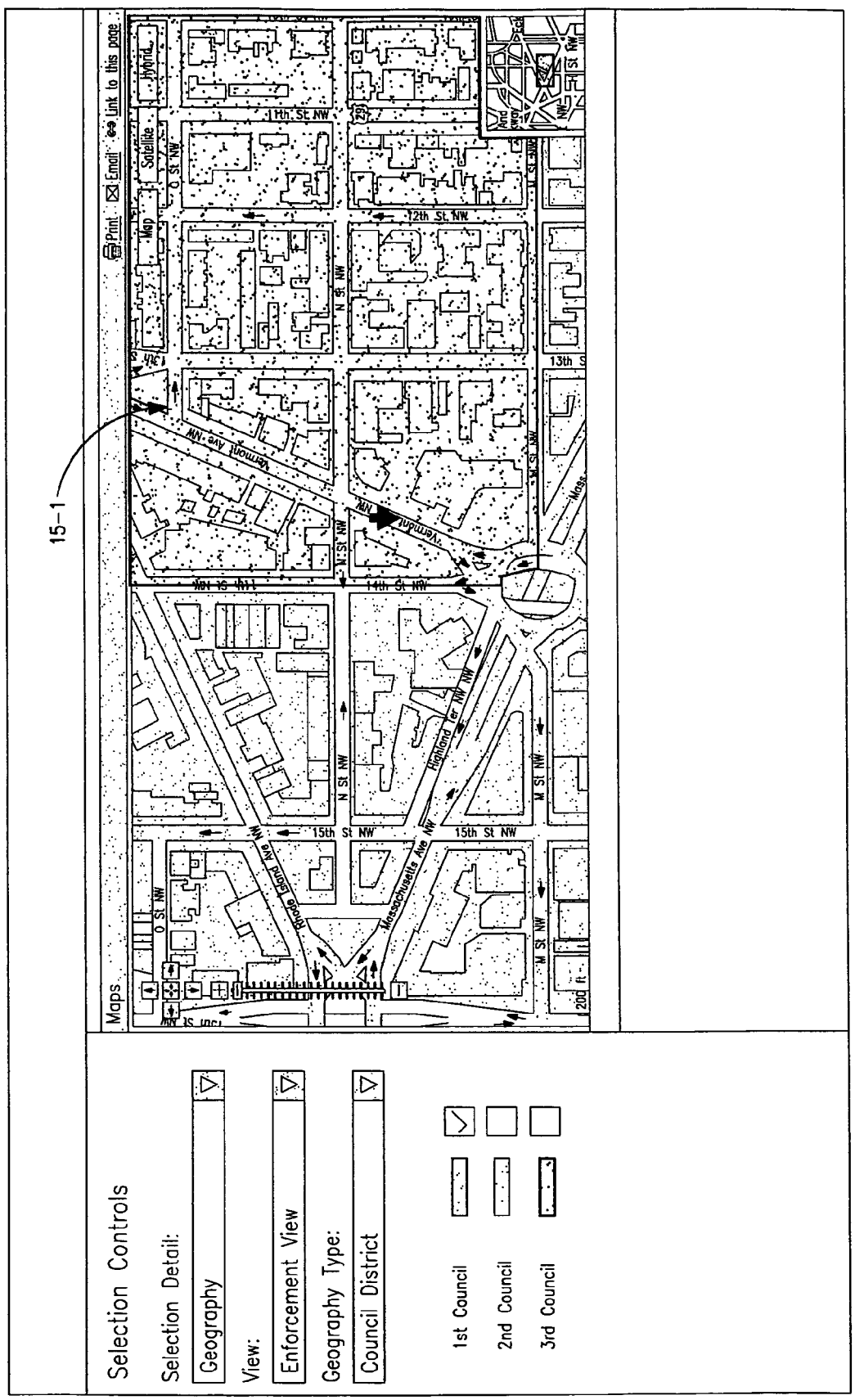

These groupings can then be used to run reports, make changes to policy, or otherwise manage the spaces. FIG. 15 shows a geographic selection of meters. Users can define different types of geographies. Such types can be either political (council district) or functional (enforcement zones). As with the groupings in FIG. 14, these selections (15-1) can be used to generate reports, change policy or manage the spaces within that geography.

type are initiated with a user selecting one or more spaces using a mouse or by selecting the spaces from a list in the Parking Public (4-27). Once selected, the user can initiate predefined actions using menus accessed through a menu bar on the top of the interface screen or by contextual menus available through a defined combination of mouse clicks. A series of parameters can then be entered by the user to define the specifics of the request. The entire request is then passed on to the logic center of the CCI (4-2) where predefined rules dictate what data elements are to be collected, how they are to be collated and to which device(s) communications should be passed.

Similarly, the icons on the map images can be used to display current status information. This information is updated either by manual request of the user to refresh the display or by automatic refreshing of the display. In either case, CCI (4-2) retrieves information regarding the current location and status of remote assets and personnel from a database containing the current information and updates the display image to reflect any changes.

Textual Reporting

Often, the information required by users (peripheral components (4-21-30) is statistical in nature. To address these requests, the invention will include textual reports which will be available to users. Reports are driven by input screens specifying date ranges, selection of spaces by groups or individually, types of statistics and information to be included, e.g. how many meters in a plant are inoperative at a particular time and sub-sections of data to be compared to one another. Reporting will take the form of written reports, tables or charts as contextually appropriate for the statistics requested by the user.

Graphical Reporting

In addition to the textual reports, graphs offer visual representations of statistics that provide quick and concise understanding of trends, comparisons and breakdowns of interrelated statistics.

Like the textual reports, graphical reports will be presented as directed by a user input screen which controls date ranges, groups or individual spaces to be included and the statistics to be graphed. Users also select the graph type to be used from a list of available graph types. When applicable, the users can compare statistics by overlaying one statistic against another. The graph selection interface provides the option for the user to specify if results are to be presented on separate axes. This is useful when comparing statistics with differing units of measure, such as comparing revenue in dollars against compliance levels measured in percentages.

Electronic Signage/Displays

The system includes electronic displays for remote units such as the space monitoring and metering equipment. Such displays (for example, the displays shown in FIGS. 11-15) include street signs and LCD displays connected to the actual metering equipment to communicate current rates and policies to the parking public. The electronic nature allows such signage to be updated to reflect changes in rates, hours of operation and so on without the need to deploy a workforce to replace or modify signs. Without such signage, quick and regular changes can not be made to such policies.

Supporting Databases and Management Systems

In order to render detailed and flexible reports in all of the necessary formats, a number of interconnected systems and databases are required. The CCI 20 coordinates the inputs of these individual data sources to create the individual presentations in any one or more of the periperhal components 21-30 shown I FIG. 4.

Data Analysis Engine

The data analysis engine is used to process raw data received from meters and user inputs.

For the processing of meter data, a system like the Smart Meter System as described in U.S. patent application Ser. No. 11/179,779, filed 13 Jul. 2005 and pending is incorporated by reference to the Brief Description of the Drawings and the Detailed Description as found in that application. This system must be expanded to allow for maximum flexibility in system management. The outputs of this processing are then stored in an associated database in the CCI (4-2). For later retrieval and compilation into the aggregated statistics required for user requested reports.

The system of the invention also allows for modeling of changes in policies affecting the operation of the parking system as formulated by the Parking Staff Supervisors (4-21) and Parking Policy Makers (4-22). By storing historical data, the system can generate theoretical reports of revenue and usage impact if changes policy had been or were to be adopted. The user can simply specify which statistics to manually alter and which statistics to calculate and the system can use the historical data to estimate the results. These results are based on actual data for target geography and allow a user to make a variety of assumptions such as the assumption that compliance levels would decrease by a certain percentage if rates were raised.

Current Status Database

The current status database is a database containing records for each asset or human resource being monitored.

Records relating to spaces being monitored by the SMMS (4-1) contain information regarding the space's usage state, violation state and maintenance state. The table is updated with each new report from the system telemetry of changes in the space's various statuses. The details of the records contain any exception cases relating to the space, its electronic parking meter, its vehicle detector or the communications device.

Records relating to human resources, for example by the Parking Staff Supervisors (4-21)21 or the Parking Policy Makers, are also updated as new data is received by the system communication techniques, such as telemetry. These records include information regarding the equipment in use by that employee (including vehicles and tools), the employee's location and any assigned or associated work orders as required by the Maintenance Personnel 30.

Parking Inventory Management Systems

One major component of managing any operation of asset, is inventory tracking. Each element of the operation is identified with a unique serial number. This serial number is used to index a database table which contains all information regarding the asset. This information includes part numbers, model numbers and manufacturer.

Additional database tables are used to track historical events regarding the asset. Such events include maintenance issues and events, upgrades, location changes and connected assets. This data is useful to the operation of the Maintenance Personnel (4-30). The supplemental tables can be used to display both current and historical data regarding any asset in the system in order to schedule maintenance, replacements or upgrades.

When problems do arise that may require replacement parts, tables storing information regarding associated replacement parts and available stock for replacements can be used to ensure maintenance crews (Maintenance Personnel (4-31) have all the necessary parts to perform needed repairs. Further tables store information regarding the sources for purchasing parts and lead times to facilitate efficient ordering of parts from their manufacturers.

Most systems also contain tools to further create efficiencies in inventory management by recording the attributes of ordering parts from manufacturers and calculating the most effective ordering quantities and shipping costs.

Maintenance History

As mentioned previously, the maintenance history of each asset is tracked. This information is important in analyzing trends of breakdowns facilitating preventive maintenance Maintenance Personnel (4-30) as well as improving the experiences of the parking public (4-27). Often, people who have been cited for violations of parking policy contest tickets due to alleged malfunctions in the parking meter. Historical information can be referenced to determine if such a failure had occurred. If so, the ticket can be dismissed. This data is necessary for the operation of the Enforcement Personnel 31.

If malfunctions occur within a defined geographic region during specific times, maintenance managers may be able to identify problems of vandalism and seek assistance from law enforcement to correct the problem.

Policy Management

The policy management database is used to track the various meter rates, days and times of operation and the enabling of special features. This database also tracks the historical application of these policies to individual spaces.

The database is referenced to process data received from the SMMS (4-10). The analysis of this raw data must apply the correct meter rate and enforcement parameters by the Enforcement Personnel (4-31) to the data in order to correctly calculate statistics and update the current space status in the current status database for display in maps (FIGS. 11-15) and reports.

Work Order Database

When remote assets report problems or maintenance needs are identified by any of the system users, a work order is created by the logic core (7-6) of the CCI (4-2). This work order is assigned a unique identification number which is used as an index in the work order database. This database in the CCI (4-2) stores information regarding what the problem is, to whom the work was assigned and when the work order was distributed to the person assigned to do the work. The database also tracks inputs received from field personnel regarding when the work was completed, what parts were needed to perform the repair and what additional work was done while on site. This information can then be referenced by management to create reports on response time, update part inventories and evaluate personnel.

Violations and Citations Database

This database described above is used to store information received by the SMMS (4-2) system. Each time a violation is identified by the space monitoring and metering system, it is recorded in the database. The identified violation is assigned a unique identification number which is used as an index for the database. The database tracks the type, length and status of each violation. The violation is also cross referenced against the information stored in the data analysis engine to link the citation to a particular occupant. If a violation is cited, information regarding the response time to that violation is also tracked.

This database is then available in conjunction with the maintenance history database to allow for complete addressing of citation complaints. This data can provide an overall picture of the complaining occupant's stay when combined with the information from the data analysis engine and the occupant identified with the violation.

Finally, the violation database can be queried by citation collection agencies—either internal or third-party—to age past-due violation payments, advance further collection efforts by contacting violators and identify violators guilty of scofflaw violations. Such violators would then be subject to stiffer fines, towing or other penalties.

The citation database stores information in the CCI (4-2) regarding each citation issued, the type of citation issued, along with the date and time it was issued, the vehicle characteristics (such as color, license plate number and issuing authority, the Vehicle Identification Number) and the location of the citation.

An example of the manner of generating a citation from a violation of a parking space is illustrated in FIG. 10 as described herein.

Collections Database

The collections database in the Citation Collection Agency (4-25) is used to store information about the monies collected during each collection of monies from the parking meters. The database is indexed by a unique identification number. The collection records track the date and times of the collection, the crew responsible for the collection and the amount collected. Further tables link the individual meters collected during each collection. This allows for cross-referencing of the date and time each meter was last collected. This serves to both audit the amounts collected from the meters as well as assist in estimating the degree to which the collection canister in each meter has filled since it was last emptied.

Financial Accounting Management System

Financial accounting management systems in the Controlling Entity's Accounting Personnel (4-23) are used to track monetary inflows and outflows. As such, any parking management system such as described in the preferred embodiment of this invention should integrate with the systems used by a city to track its finances. This allows a city to directly feed the vast amount of financial information drawn from the parking management system into reports, audit mechanisms and budgeting.

Remote Electronic Assets

Space Monitoring and Metering Systems

A primary feature of the preferred invention embodiment is the equipment used to monitor the base asset managed by the parking systems in accordance with the present invention departments. The combination of a detection technology to monitor the arrival and departure of occupants and a metering interface for users of the space allows for complete control of that asset and reporting its use. Such technology is described the aforementioned U.S. patent application Ser. No. 11/179,779 and the detailed description and Brief Description of the Drawings therein are incorporated by reference.

The detection technology monitors the space and, when an arrival is detected, communicates that fact to the electronic parking meter. This begins the user's time-lease of the space. The electronic meter accepts payment and determines the amount of time to be granted the user based on the amount of the payment. The meter tracks the parking time limits and, in conjunction with the signal beginning the occupant's lease of the space, determines the amount of time an occupant should be allowed to purchase. The meter also provides an outward indication of the time remaining for the user.

For each event occurring at the space, a record of the event is made. Each record contains the type of event, the date and time of the event and any detailed characteristics of the event, such as payment amount or type of meter malfunction. This operation is described in the aforementioned patent application.

Figure 4:
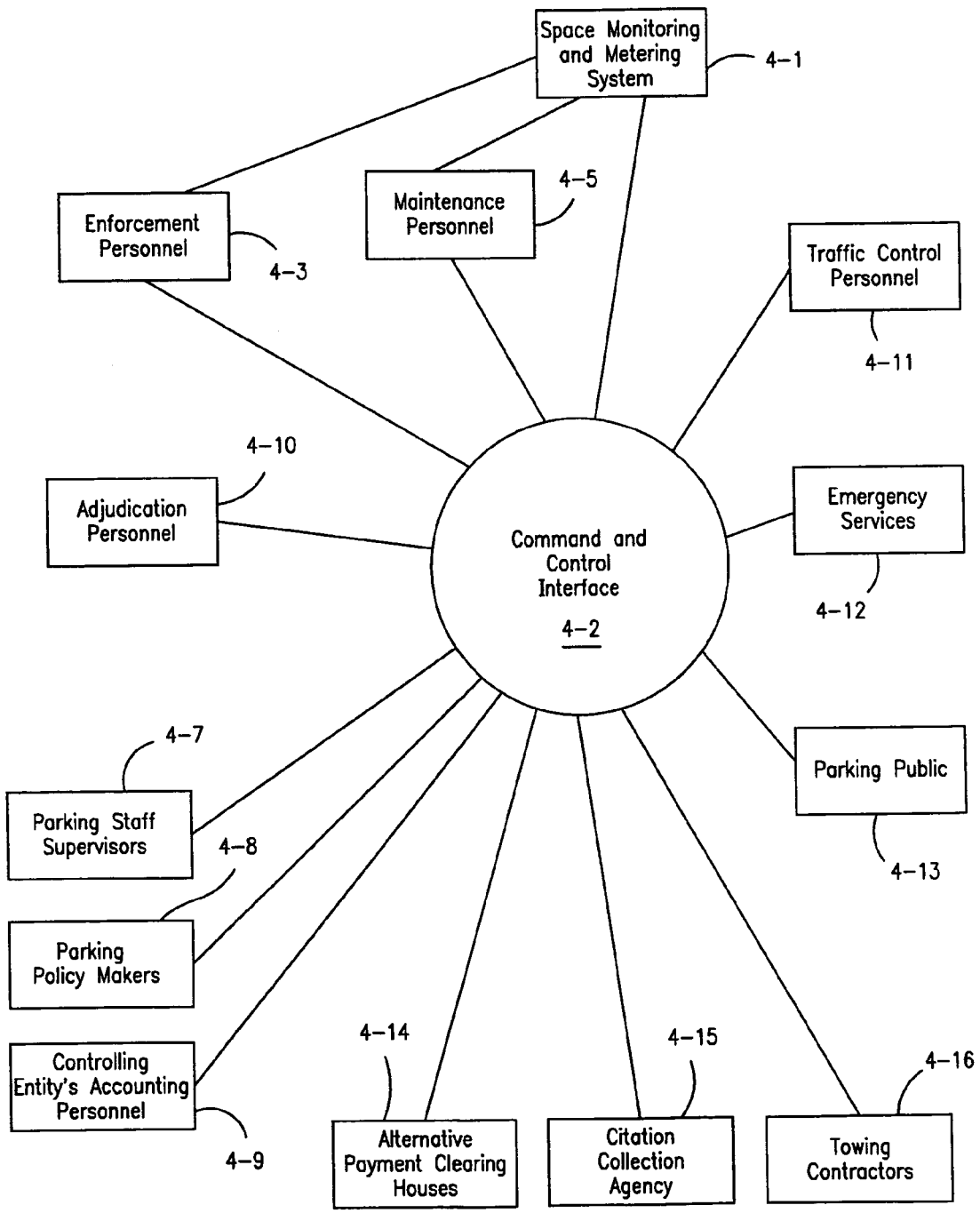
FIG. 4 is a diagram of the Command and Control Interface (CCI) showing its communication interconnection with the major components of a typical vehicle parking system; in an another alternate embodiment of the invention.

This SMMS (4-1) is connected either wirelessly or otherwise to the CCI (4-2) as shown in FIG. 4. This allows the SMMS to communicate both high priority events and logged events back to the CCI 20. The SMMS also receives updates to programming or parameters of operation from the CCI (4-2). This allows remote updates to meter rates, hours of operation and other use details. Electronic displays (not shown) allow users to be informed of the current rates and hours without the need for workers to be deployed for the purpose of updating such signage. Street signs can also be updated in a similar fashion.

With the addition of this signage to the system, new concepts can be applied to parking management. Before the incarnation of such a system, these concepts were only theoretical. Parking management has been shown to impact the environmental and economic landscape of cities. In times of high demand, drivers will cruise an area seeking convenient parking. The invention implements a pricing structure for parking which is based on demand for a location. The user can programmatically adjust rates to achieve particular benchmarks in occupancy. The policy managers of a city can define areas of common rate structures which are monitored for levels of occupancy. Target levels of occupancy can then be set by the policy makers. The system then automatically increases parking rates when occupancy levels rise above that target level or lower rates if occupancy drops below the target occupancy level. The user can also determine the means by which rates are raised and how quickly this is done. This can be done by specifying an algorithm and intervals of both time and price change for changes to be enacted. The system is capable of defining multiple algorithms within a given entity so that the system can be fine tuned to the specific needs of each geography. This also allows the use of different algorithms by each entity should they choose to implement a different method of rate determination than other cities.

Additionally, spaces without metered parking can be equipped with detection devices to enforce those spaces with parking that is restricted or prohibited by time of day, day of week.

Enforcement Handheld Computers

Enforcement handheld computers are any kind of handheld electronic device known to the enforcement personnel of a parking system (not shown) which can be connected to the CCI (4-2) through any combination of wired or wireless communications technology known to those skilled in that art. These devices can receive a combination of information from the CCI (4-2), bar codes, optical character recognition technologies and User inputs.

The handheld devices and associated communication techniques provide a standardized form for the enforcement officers to write citations. Officers use information provided by the CCI (4-2) to identify the type of violation or violations being observed. Scanning of the parking meter itself identifies the location of the violation and the internal clock timestamps the citation. The license plate can be scanned and the vehicle's Vehicle Identification Number scanned for its inclusion in the citation record.

The handheld device is connected to a printing device (not shown, but part of standard handheld devices) which creates a written citation for placement upon the offender's vehicle. The completed citation's information is then fed back to the CCI (4-2 for recording into the violation database as well as updating of the current status database to indicate a violation was addressed. The aforedescribed functions and operations are performed by the Enforcement Personnel (4-31) and Traffic Control Personnel (4-29).

The completed citation also allows the CCI (4-20) to identify the location of the enforcement officer and provide information regarding additional violations in that officer's vicinity. The device also allows the enforcement officer to report any type of problem with the meter that requires the involvement of maintenance personnel. The officer fills out an electronic work order which is communicated back to the CCI for assignment to a work crew. These functions and operations are performed by the Enforcement Personnel 31.

Complementary technology to that described above for carrying out the various functions described in this section is disclosed in the Brief Description of the Drawings and the Detailed Description of the aforementioned U.S. patent Ser. No. 11/179,779.

Maintenance Handheld Computers

Maintenance handheld computers are any kind of a handheld electronic device which can be connected to the CCI 20 though any combination of wired or wireless communications technology known to those skilled in such techniques. These devices can receive a combination of information from the CCI 20, bar codes, optical character recognition technologies and user inputs.

The peripheral Maintenance Personnel component shown in FIG. 1 receives electronic work orders from the CCI. The work orders direct personnel to problem meters along with information as to what is wrong with the meter, what parts may be needed and how long the meter has been out of order.

Once work has been completed, maintenance personnel record the work completed to repair the meter, any changes in inventory due to replacement of parts or equipment as well as any additional work performed beyond the reported problem. All of this information is time stamped and communicated back to the CCI which updates all appropriate databases. In systems which segregate collections activities from maintenance, the device provides an interface through which a maintenance worker can alert collections that a meter is in need of collections to operate correctly. An electronic work order can be created and communicated back to the CCI for assignment to a collections crew.

Collections Handheld Computers

Collections handheld computers are any kind of handheld electronic device which can be connected to the CCI (4-2) though any combination of wired or wireless communications technology. These devices can receive a combination of information from the CCI (4-2), bar codes, optical character recognition technologies and user inputs.

Collections workers use the devices to scan the meters as they collect the monies stored in the parking meter vault. This provides a timestamp for each collection made at a given meter. This information is communicated back to the CCI (4-2) where it is stored.

The device also allows the collections workers to report any type of problem with the meter that requires the involvement of maintenance personnel. The officer fills out an electronic work order which is communicated back to the CCI for assignment to a work crew. These functions and operations are carried out by the Controlling Entity's Accounting Personnel 23.

Internal Users

Maintenance

Maintenance workers can access the CCI to receive electronic work orders. These work orders can be tailored to the way work crews are equipped with tools and inventory as well as location. This method of deployment reduces or eliminates the need for regular maintenance route following. Rather than expending the effort to locate and identify specific failures, workers can be directed to these specific failures, increasing efficiency greatly.

Workers also can use the electronic work orders to track repairs and provide updates to system operability in near real time. The details of the work orders also track the use and movement of inventory.

The above operations and functions are carried out by the Maintenance Personnel 30 as described above under the headings Maintenance History and Work Order Database.

Enforcement

Enforcement officers access the CCI (4-2) to receive information about the location and types of violations. This can allow officers to go directly to areas in which a high incidence of violations is occurring. This means officers can effectively enforce a much greater number of meters with less effort.

The CCI (4-2) then passes information to the handheld device used for ticket writing to assist in writing citations. Information regarding the details of the violation, such as type of violation and its related ordinance are added to the citation record. The officer then adds the relevant information from the cited vehicle by scanning license plates and Vehicle Identification Numbers. The information regarding the location of the violation can then be entered into the record by scanning the meter's space number. Alternatively, the needed information can be keyed in by hand using the handheld computer. This process applies not only to parking meter violations, but also any space equipped with occupancy detection devices.

Once the citation record is complete, the details are transmitted back to the CCI 20 and stored in the citation database. The details are also then used to produce a written citation. Printers attached either wired or wirelessly to the handhelds produce easily readable citations in seconds. This written citation is left on the cited vehicle. The CCI can then use the location of the citation to direct the officer to nearby violations.

Collections

Collections workers in the Citation Collection Agency (4-25) are alerted by the CCI (4-2) through the handheld computers what meters require collection. This allows for collections to be performed with greater efficiency. Additionally, collection workers scan each meter as it is collected and the collection event is time stamped. These time stamps are recorded in the collections database for use in auditing reports.

Supervisory

Supervisors in the Parking Staff Supervisor's (4-21) component query the CCI (4-2) for information regarding the status of the parking system and related personnel. The CCI (4-20 provides maps and reports for supervisors to see in near real time what spaces need attention from personnel and the location of each personnel available to perform the needed work.

The reporting gives supervisors up to date information regarding city-wide operability, utilization and compliance levels. The information is presented in a manner that is instantly understandable. The status of various assets is displayed using color coded icons. These icons are placed on a map generated by the CCI in the locations representing the geographical coordinates of each asset.

The collection of data regarding when parking events were handled by personnel in relation to notification being sent also provides performance data for supervisors. Such reports can be used to identify problems areas such as difficult repairs, inaccessible locations and workforce shortages. With such performance reports, individual employees can also be measured for their relative performance and compensated for effective work habits.

Accounting

Accounting personnel can access the CCI (4-20) to obtain up to date information regarding the revenues received by parking operations. Many times, tracking is required to ensure security of the funds deposited by the parking public. Audits of the monies collected by meters versus the amounts deposited ensure end to end security of those funds.

Accounting can also query the CCI (4-20) for information regarding outstanding citation payments and the aging of such payables to the city. Interoperability of the system with the city's financial accounting system allows information to be quickly and accurately incorporated into financial reports. The CCI (4-2) formats data for export directly to the accounting systems. Since information is readily transferred from the parking management system to financial accounting management systems, cities can use the features of financial accounting management systems to easily budget for future receipts from parking operations.

Finally, accounting personnel can also make use of the modeling capabilities of the preferred embodiment of the invention to understand the financial impacts of proposed policy changes such as rate or enforcement hour changes.

Inventory and Purchasing

Since parts and equipment are closely monitored and delivery times estimated, inventory can be reduced to the most efficient level. Purchasing managers can order replacement parts, track returns and receive new stock through a unified interface provided by the CCI (4-2). This interface is kept up to date on a near real time basis as personnel supply parts and equipment for new installations and repairs.

Purchasing agents can update information regarding lead times, re-order points and other pertinent information by reviewing the purchasing history. A query sent to the CCI (4-2) generates a report of how many parts were ordered from which vendor and at which frequency.

These operations and functions can most likely be performed by Maintenance Personnel (4-30).

Policy Makers

Policy makers in the Parking Policy Makers component (4-22) for a city can query the CCI (4-2) for reports regarding the usage patterns and revenues historically experienced in different geographies and/or under different parking policies. These reports can be used to identify unmet goals within the parking management. If a goal of parking managers is to achieve specific occupancy levels or compliance levels, areas of concern can be identified and action take to change rates, hours of operation or any other factor to better meet those management goals.

Once the areas of concern are identified, the CCI (4-2) can access the data analysis engine's modeling capability to determine the effects of changing parking policies. Such testing can be done to determine the effectiveness of the proposed changes without trial and error implementations of policy modifications. This saves public confusion and dissatisfaction with the parking system.

Adjudication

When handling ticketing complaints, adjudicators in the Adjudication Personnel component (4-32) can query the CCI (4-2) for information about both the violation in question and the violator. The data in the citation database, violation database and the data analysis engine are combined and presented as a unified report by the CCI (4-2) illustrating all of the details of the violation including time of the violation, the type of violation(s) observed, the arrival and departure times of the occupant and the amount the occupant paid. By accessing the maintenance database, the CCI (4-2) can also present information regarding the operability of the meter at the spot if applicable. This allows the adjudicator to quickly determine the validity of the citation. The adjudicator can also then query the CCI (4-2) for information regarding the violator. The history of citations received by the occupant and the rate at which citations were paid, dismissed or left unpaid can be reported. This allows for the adjudicator to identify regular parking abusers from those truly righting an injustice.

Emergency Services

Parking is generally prohibited in front of equipment needed by emergency services such as fire hydrants. Space monitoring equipment placed in such places by the SMMS (4-33) quickly identify infractions and allow citation and/or towing of violating vehicles from such spaces. This decreases or eliminates the danger to the public that emergency workers would be hindered in their efforts to respond to an emergency.

Similarly, there are instances when emergency services need to clear streets of parked vehicles. In such instances, up to date information regarding the number of vehicles to be cleared can help deploy tow trucks and personnel to perform the task effectively. Mangers can query the CCI 20 for this information.

The above functions and operations are carried out by the Emergency Services component (4-33).

Traffic Control

Studies of traffic flow have indicated that much of traffic congestion observed in areas where on-street parking exists is due in large part to the high levels of occupancy. Traffic control managers can query the CCI (4-2) to determine if areas of high congestion also show overly high levels of parking occupancy. If a correlation exists, action can be taken to lower the demand for parking in those areas. This is often done by increasing the price for on-street parking in that area. With lower demand levels, fewer drivers will "cruise the block" looking for a parking space. Those willing to pay the higher price for parking will also be more able to find parking in those locations.

These functions and operations are performed by the Traffic Control Personnel (4-29).

Public Users

Parking Public

The parking public can access the CCI (4-2) in a number of ways as describer below. The parking public uses an interface to find and/or pay for parking in a space.

In-Car Navigation Systems

Multiple services exist that direct drivers to requested locations and places of commerce. Navigation systems often offer suggestions for restaurants, shopping areas or other resources. Many such services provide directions to those locations by use of a geographical information system. Because the CCI (4-2) contains geographical coordinates for parking spaces, the location of available spaces can be provided to users either close to the user's current location or a specific destination. Such systems reduce or eliminate the extra environmental impact that cruising for parking spaces creates. Such cruising typically would expend larger amounts of fuel and generate exhaust levels much higher than situation in which drivers are directed to open spaces. It also gives drivers an accurate perspective of parking availability. Drivers who may normally be discouraged to visit merchants in a certain location because of a perceived parking shortage would be able to find open spaces in that vicinity more easily. With greater customer access to locations, merchants in that area would experience greater sales opportunities. This increase creates an economic lift for the entire community.

Cell Phone

Technologies currently exist to allow users to pay for parking over the phone. This solves the problem of paying for time without the need to carry small change. However, such systems put a strain on enforcement efforts. The CCI (4-2) gives such systems a means by which time may be displayed on the electronic parking meters.

A user dials-up a telephone number and provide the parking space number for which they wish to purchase time. The user also provides the amount of time he wished to purchase and a payment source such as a credit card. The CCI (4-2) then issues a command to the specified meter to display the appropriate amount of time so enforcement officers enforce the meters in a traditional way. This is the function of the Enforcement Personnel (4-31).

Internet

Public parkers can also access the CCI (4-2) through a public facing web page to plan trips. The user submits one or more destinations and an expected arrival time. Using a combination of current and historical usage data, the logic core (7-6) determines a parking locale near the destinations which is most likely to be available. The CCI (4-2) then allows the user to determine the time limits and costs of parking at the suggested locations. With this information, the driver can drive directly to the location and not spend time searching the area for available parking spaces. This saves the driver time, reduces traffic congestion and saves fuel.

Users can also reserve spaces. The user reserves the space either directly or through a third party. The reservation is passed to the CCI (4-2) which then sends a signal to the electronic meter at the reserved parking space. The meter then displays an indicator that either the space is reserved or otherwise not available for parking. When the driver arrives at the space, he identifies himself either by dialing a number on a cell phone and entering a reservation code or by connecting an electronic identification device into the meter. Such identification devices could be a magnetic stripe card, Smart Card or RFID card. This process would unlock the meter and allow the driver to purchase time at the meter.

The internet could also allow the driver to purchase time on the parking meter in a similar fashion that a cell phone could be used. The driver would provide the space number and amount of time to be purchased through a website. The CCI (4-2) would accept this request and issue a command to the associated parking meter to display the appropriate amount of time. These operations are represented by the component Public Parking (4-27).

Merchants

Merchants access the CCI (4-2) through a similar web page interface as drivers might use. On this interface, merchants help direct customers to available parking as a customer service. As a further service, merchants pay for all or part of the customer's parking cost through the website as well. The customer tells the merchant what space they parked in upon entering the store and the merchant could purchase time on the driver's behalf. The CCI (4-2) then instructs the meter located at that space to add the specified amount of time to the display. These functions are provided in the Parking Public (4-27) component.

$3^{rd}$ Party Users

Towing Contractors

Many cities use towing or "booting" of vehicle to impound vehicles belonging to individuals consistently violating parking regulations and then refusing to pay the fines they occur. Additionally, cities often tow vehicles for which taxes have not been paid. This process requires the identification of such vehicles by enforcement personnel, the coordination with towing contractors and the direction of the towing authority to the proper location.

The report of each citation written is communicated to the CCI (4-2) in near real time. The logic core (7-6) can then analyze the citation details and compare it to the citation database and determine if a given vehicle is a towing or booting candidate. If so, the appropriate personnel are notified of the vehicle and its location. The vehicle can then be impounded without any added intervention on behalf of the parking enforcement officer.

These functions are performed in conjunction with the logic core (4-22) and the Enforcement Personnel (4-30).

Alternative Payment Clearing Houses

Many types of payment alternatives to coins have been introduced for payment of parking. These payment options are often difficult or impossible to implement as the information regarding the payments made must be collected from the individual spaces. The communications backbone to the CCI (4-2) eliminates the difficulty of collecting such information. Alternative Payment Clearing Houses (4-24) accesses the CCI (4-2) and requests the information regarding the payments made. The CCI (4-2) then queries the meters for that information, compiles it and passes it on to the payment clearers in the Alternative Payment Clearing Houses (4-24) and in the format required by those systems.

Citation Collection Agencies

In order to collect past due citations, many parking authorities employ third parties to find offenders and collect the past due fines. Such agencies access the CCI (4-2) to track up to date information on violation details, payment status and age. Additionally, the CCI (4-2) formats the data for export to the agency's own systems. These functions are also performed in the Alternative Payment Clearing Houses (4-24).

Methodologies

The integrated parking management solution described by this invention allows parking managers to solve the problems related to the fair distribution of parking to the general public. The integration of these multiple systems in near real time addresses the short-comings of previous methods and technologies.

Near Real-Time Updates

The primary purpose of the invention is the use of near real time communication of parking events to a Central Command and Control Logic Center (5-2) which then analyzes it and displays it so end users, such as Remote Assets 1, 2 and 3 and DB1, DB2 and DB3 make use of it as they wish. This Central Command and Control Logic Center (5-2) stores the information it receives, but also issues alerts for action when needed. The timely delivery of information is essential in realizing benefits of efficient management of remote assets and personnel. Due to the diverse nature of devices and systems, the Central Command and Control Logic Center (5-2) must be able to communicate using multiple technologies and protocols.

Whenever remote assets are integrated into a network, wireless technologies have the benefit of limited amounts of infrastructure to be installed to enable communications. This, however, means that the devices must be self-powered. Power consumption can be managed. Part of managing is the selective timing of communications. When status changing events occur, any one or all of the Remote Assets 1, 2 and 3 initiates communication with the Central Command and Control Logic Center (5-2) passing the change of status as well as any additional stored information. This assures complete transmission of data from the Remote Assets 1, 2 and 3 with the minimal number of transmissions needed to keep asset status completely up to date.

Electronic record keeping on the part of personnel completes the loop of information to the CCI (4-2) historical reference and review. It also updates inventory levels so that supporting agencies such as purchasing can ensure availability of needed parts and personnel.

Need-Based Response

Current parking operations rely on regular routes to visit each space so that problems can be identified and fixed. This method is inefficient and results in loss of both revenues and manageability for the parking system.

With the integration of these systems, personnel and equipment can be deployed to locations where they are needed. Because effort does not need to be invested in finding spaces in need of maintenance or enforcement attention, each worker can maintain or enforce more spaces at one time. In addition, the needed action can be taken for each issue observed in less time. This means malfunctioning assets will be out of order for less time. Because of this, they can return to operation and availability for use more quickly.

Automated Route Generation

In situations where the deployment of personnel and equipment can not be efficiently accomplished, geographically co-located groups of meters can be identified for attention. Workers can then be deployed to the location of that group of meters.

An example of such a deployment is that of meter collections. When geographically co-located meters have collected coins nearing the capacity of the collection canisters, they can be grouped together and an order issued for their collection. Each group's average canister volume usage can then be ranked. The ranking determines the urgency with which each group meters should be collected. Workers can then be deployed to those groups in most urgent need of collection.

Logic Core Updates and User Configuration

The invention uses a combination of pre-defined as well as customized instructions entered by authorized users to determine how the logic core reacts to the receipt of event notifications and user queries.

The CCI (4-2) provides a Communications Interface Layer (7-1) which allows users to define what events are to automatically trigger notification of in-field personnel or delivery to supervisors for manual assignment to a specific work crew.

Pre-defined instructions are used to maintain retrieval and calculation processes to respond to user queries. Such instructions also process raw data streams to store historical records of events, create specialized record for maintenance, enforcement and collections as well as the calculation of standard statistics. The combination of pre-defined routines and user configuration allow the logic core to efficiently produce standard outputs while giving users flexibility in operational flow.

Therefore it is desired that the present invention not be limited to the specific embodiments describer herein, but that it include any and all such modifications and variations that would be apparent to those skilled in the art to which the inventions directed. It is our intention that the scope of the present invention should be determined by any and all such equivalents of the various terms and structure as recited in the following annexed claims.

The invention claimed is:

1. An integrated parking management system (IPMS), comprising:
    a central command and control logic center (CCLC) for collecting, storing and analyzing data received from remote locations in the parking system to create actionable outputs for controlling remote parking system components (RPSC) in the parking system (PS); said (CCLC) further communicating with said (RPSC) and receiving feedback from said (RPSC) to perform requested operations from said (RPSC);
    a computerized data flow system forming a command and control interface (CCI) and including a logic core having a programmable set of rules to be applied to said (RPSC) components and a communications interface layer (CIL) including (1) a presentation engine for generating interactive documents for display, and (2) means for enabling exchange of data streams to said (RPSC) and (3) routing tables for tracking both the means and protocols to be used when said (CCI) is communicating with said (RPSC);
    said communication interface layer receives data to be transmitted and a parking system component address to which data is to be transmitted; and
    at least some of said (RPSC) transmitting data via said (CCI) to said (CCLC) representing the status of the parking system and receiving instructions from said (CCLC) via said (CCI) for controlling the operation of said parking system.

2. An (IPMS) as claimed in claim 1, further comprising space monitoring and metering system (SMMS) for providing information specifying the status of the parking spaces within the (IPMS) and at least one of the enforcement services and maintenance services and said (SMMS) transmitting said information to said (CCI) and communication means via said at least one of said enforcement services and maintenance services for providing two-way transmission between said (CCI) and said (SMMS).

3. The (IPMS) according to claim 1, wherein said (RPSC) comprise at least one of the parking public, traffic control services, emergency services, administrative services, parking staff supervisors, parking policy makers controlling entity's accounting personnel, alternative payment clearing houses, citation collection agency, adjudication personnel, and towing services.

4. An integrated parking management system (IPMS), comprising: a number of parking meters each having data transmission capability; a plurality of collector nodes forming groups of collector nodes for receiving data from selected groupings of said parking meters and each said groups of collector nodes receiving said data;
 a gateway receiving said data transmitted from said groups of collector nodes and transmitting data to said collector nodes;
 means for transmitting data from said gateway; a storage device and web portal for receiving data from said gateway and creating reports relating to the status of the parking meters; and
 means for transmitting said reports to end users of the (IPMS).

5. An (IPMS) as in claim 4, wherein said end users comprise at least one of a parking enforcement entity, a parking manager, the public users of the parking system, and a maintenance entity.

6. An integrated parking management system,
 comprising: space monitoring and meter systems (SMMS) including a number of parking meters; collector nodes dispersed throughout the area in which said meters are deployed and forming a mesh network for receiving data from said SMMS and transmitting data to said SMMS;
 gateway devices centrally located within said SMMS for wirelessly receiving data from said collector nodes;
 an internet communication system;
 said gateway devices wirelessly transmitting data over said internet system to a specific address in the SMMS;
 a Command and Control Interface (CCI) for receiving data from said SMMS via said gateway devices, Internet and Collector Nodes and having a programmable set of pre-defined and user-definable rules applied to the parking event data received from the SMMS and
 a router/firewall device for receiving data delivered to said specific address and preventing unwanted access to the CCI and wherein said CCI includes a logic core and a communications interface layer (CIL);
 said logic core includes a programmable set of rules to be applied to parking events and requests as the CCI receives notification of them;
 said CIL including a presentation engine for generating interactive documents for display in appropriate display devices
 and enables and allows for the exchange of
 data to remote devices via cellular, satellite or other long range wireless connections; said logic core communicating data to said CIL for distribution to the requesting user or remote electronic parking asset; and
 wherein the rules of said logic core parses the data stream into applicable data elements for forwarding to the appropriate databases or management systems; said rules further defining for each data stream markers upon which the data stream is to be parsed; said rules further dictating which system is to receive those parsed elements and if returned data is expected; and each data stream is then passed to a specific data base or management system; and said logic core transmitting data to said CIL.

7. An integrated parking management system,
 comprising: space monitoring and meter systems (SMMS) including a number of parking meters;
 collector nodes dispersed throughout the area in which said meters are deployed and forming a mesh network for receiving data from said SMMS and transmitting data to said SMMS;
 gateway devices centrally located within said SMMS for wirelessly receiving data from said collector nodes;
 an internet communication system;
 said gateway devices wirelessly transmitting data over said internet system to a specific address in the SMMS;
 a Command and Control Interface (CCI) for receiving data from said SMMS via said gateway devices, Internet and Collector Nodes and having a programmable set of pre-defined and user-definable rules applied to the parking event data received from the SMMS and
 a router/firewall device for receiving data delivered to said specific address and preventing unwanted access to the CCI;
 and wherein said CCI includes a logic core and a communications interface layer (CIL);
 said logic core includes a programmable set of rules to be applied to parking events and requests as the CCI receives notification of them;
 said CIL including a presentation engine for generating
 interactive documents for display in an appropriate display device and enables and allows for the exchange of
 data to remote devices via cellular, satellite or other long range wireless connections;
 said logic core communicating data to said CIL for distribution to the requesting user or remote electronic parking asset; and wherein the rules of said logic core parses the data stream into applicable data elements for forwarding to the appropriate databases or management systems; said rules further defining for each data stream markers upon which the data stream is to be parsed; said rules further dictating which system is to receive those parsed elements and if returned data is expected; and each data stream is then passed to a specific data base or management system; and said logic core transmitting data to said CIL; and wherein said CIL receives incoming requests and status updates from the Space Monitoring and Metering Systems (SMMS) and parses the data stream to single-out various data items included in the data streams;
 said CCI enters a processing loop until each of the various data items have been processed by formatting said data and sending it to a data base management system defined in the logic core programming and acknowledgement is received from the data base or system; said logic core programming indicating that data has been acquired and temporarily stores the received data in the CIL; and
 said CIL delaying processing for the returned data and when all of the data have been processed, the logic core dictates a means by which any returned data is to be compiled and the resulting data compilation is sent to the CIL for delivery to all pertinent assets and users.

* * * * *